US005843252A

United States Patent [19]

Murphy

[11] Patent Number: 5,843,252

[45] Date of Patent: Dec. 1, 1998

[54] HIGH SPEED CONTINUOUS CONVEYOR PRINTER/APPLICATOR

[75] Inventor: William J. Murphy, South Acworth, N.H.

[73] Assignee: Imtec, Inc., Bellows Falls, Vt.

[21] Appl. No.: 695,948

[22] Filed: Aug. 13, 1996

Related U.S. Application Data

[60] Continuation of Ser. No. 263,722, Jun. 22, 1994, abandoned, which is a division of Ser. No. 868,332, Apr. 14, 1992, Pat. No. 5,342,461.

[51] Int. Cl.$^6$ .................................................. B32B 31/00

[52] U.S. Cl. ........................... 156/64; 156/277; 156/285; 156/364; 156/384

[58] Field of Search ............................ 156/64, 277, 285, 156/360, 361, 362, 363, 364, 384, 540, 541, 542

[56] References Cited

U.S. PATENT DOCUMENTS

| | | | |
|---|---|---|---|
| 3,026,236 | 3/1962 | Hein et al. . | |
| 3,250,278 | 5/1966 | Rudszinat et al. . | |
| 3,328,080 | 6/1967 | Schulter . | |
| 3,329,550 | 7/1967 | Kuchech . | |
| 3,427,214 | 2/1969 | Voigt . | |
| 3,450,590 | 6/1969 | LaMers . | |
| 3,483,059 | 12/1969 | Dinter . | |
| 3,729,362 | 4/1973 | French et al. . | |
| 3,772,123 | 11/1973 | Clark et al. . | |
| 3,907,626 | 9/1975 | Cook . | |
| 3,910,811 | 10/1975 | Paxton et al. . | |
| 4,025,328 | 5/1977 | Del Rosso . | |
| 4,046,613 | 9/1977 | Kucheck et al. | 156/249 |
| 4,255,220 | 3/1981 | Kucheck et al. . | |
| 4,636,166 | 1/1987 | Franks et al. | 156/DIG. 31 X |
| 4,784,714 | 11/1988 | Shibata | 156/384 X |
| 5,133,827 | 7/1992 | Ratermann . | |
| 5,232,539 | 8/1993 | Carpenter et al. . | |
| 5,399,228 | 3/1995 | Schroeder et al. | 156/542 |

*Primary Examiner*—David A. Simmons
*Assistant Examiner*—Paul M. Rivard
*Attorney, Agent, or Firm*—Stephen G. Matzuk

[57] ABSTRACT

A label printer and applicator system which determines the height and position of moving objects on a conveyor while printing labels and positioning the labels for application on the moving objects. The printer/applicator includes a controllable label buffer, applicator actuator and label ejector to receive and apply the printed label, or eject the label when it has been determined that the application to the object cannot be made. Further embodiments include multiple applicators deployed along the conveyor to permit higher conveyor velocities and avoidance of unlabeled objects due to height/proximity relationships with adjacent packages.

10 Claims, 23 Drawing Sheets

PRINT MODE
(TRANSPORT SYNCRONOUS
WITH PRINTER)

STRIP POSITION
(PRINTER STOP)

PARK POSITION

SECTION "A"-"A"

SECTION"A"-"A"

SECTION"B"-"B"

HIGH SPEED CONTINUOUS CONVEYOR PRINTER/APPLICATOR

This application is a continuation of application Ser. No. 08/263,722, filed 22 Jun. 1994, now abandoned, which is a division of application Ser. No. 07/868,332, filed Apr. 14, 1992, now U.S. Pat. No. 5,342,461.

FIELD OF THE INVENTION

The present invention relates to object labelling systems, in particular, to labelling systems adapted to print and apply labels to packages of substantial size variation on moving conveyors.

BACKGROUND OF THE INVENTION

Labelling of packages has been an ongoing requirement for centuries. As automation becomes evermore a fact of life, the label and its information content play an ever wider role in achieving automation. The information on the label may contain information relating to the contents of the package, the source or destination of the package, relevant purchase and transit data, etc. In many applications, it is desirable to use this information in the course of processing the package. For example, the part number of the contents may be used in inventory management or the destination address may be used in automatically sorting packages.

To achieve automation effectively, some form of machine readable code such as bar code is usually employed. This then requires the use of automatic reading equipment to determine the information content on the label. Further, in the normal case where the information cannot be preprinted on the package, it is highly desirable to include some form of automatic label printer and applicator. Furthermore, packages are usually processed by a continually moving conveyor rather than manually moved.

In certain cases, the objects to be labelled are all the same size and the labels can be placed in a known fixed spot on the package. For example, one can define a fixed X-Y location on the side of a box, register packages against one side of a conveyor, locate a printer, applicator and package sensor suitably to apply the label and subsequently similarly locate a scanner to scan this same X-Y region of the package and thus read the label. This approach may work in a manufacturing environment where there is a limited number of package sizes.

However, in the majority of applications, notably merchandising and transportation, packages come in all sizes and shapes from a variety of sources not under the direct control of the sorter and defining a fixed location becomes impossible. Further, packages in transport tend to rotate about their vertical axis as they pass through various stages of the conveyor, thus possibly changing the face side that they present to a scanner compared to the labelled side. Some packages can also tend to tumble (rotate about a horizontal axis), especially when subjected to rapid acceleration, but this can usually be controlled if the package is oriented in its most stable condition when it is first placed on the conveyor.

The optimum place to put a label is thus the top of a package, regardless of whether the reader is human or a machine. If the label is on the side, rotation of some of the packages will be required to find the label and read it. Such rotation of the package in order to read a label is awkward when done manually and very cumbersome to automate. Thus labelling the top and subsequently reading the label is easy to do manually, but heretofore has presented considerable difficulty when done automatically, especially in view of the considerable variation in package height frequently encountered.

A significant component in a automatic labeling system is the device which applies the labels, known as the applicator head. Previous applicator head devices used two single passage air lines and a single manifold. Vacuum was applied through a controllable valve to one air line and thence to the manifold to retain the label. When it was desired to apply the label, the first line was disconnected and the other air line was connected to a source of pressure. The air blowing through the single manifold then released the label. For short stroke systems this approach was satisfactory. In the applicator herein disclosed, this approach is unworkable. The valves required can be located in only one of two places, either stationarily mounted to the frame of the applicator assembly or carried along with the applicator arm. If stationarily mounted, the air line from the valve to the apply head becomes untenably long, being in excess of 8 feet in the instant embodiment. This makes for extremely sluggish response time and unreliable label application. Carrying external valves along with the applicator head results in excessive weight and poor applicator response.

The devices which position or move the applicator head present an additional set of problems. The objects to be labelled are traveling along a conveyor which can be moving at any speed. The applicator will require a finite time to move the apply head down to a position just above the package to be labelled, which time will vary with package height. During this first half of the applicator cycle time, the package will move a finite distance along the conveyor. This package motion must be accounted for in determining when to initiate the applicator cycle. The applicator cycle time is thus a variable as a function of package height. The package motion is a variable that is a function of the conveyor velocity during the apply time. The conveyor velocity can be measured directly and in most (but not all) cases can be assumed constant during any one apply cycle. Since the apply cycle must be initiated prior to its occurrence, the apply cycle time must be predictable in advance over the full range of package heights in order to account for package motion during the apply cycle properly. Any errors in height measurement, conveyor velocity measurement and actual apply cycle time will result in a label position placement different from that desired. Hence the motor and control system chosen to drive the applicator must not only be capable of achieving the necessary throughput but the position performance must be predictable over the full range of package heights.

It would seem at first glance that a rapid acceleration constant velocity motor such as a clutch brake system or a stepping motor would be ideal for the application but as it turns out this is not the case. If half the allowable cycle time (400 milliseconds) is allocated to the down stroke, then the average velocity must be 80 inches per second with no start or stop times considered. Allowing 50 milliseconds start time and 25 milliseconds stop time brings the velocity to 96 inches per second and requires 5 G's to start the arm and 10 G's to stop it. The travel distance during starting is 2.5 inches and that during stopping is 1.25 inches. A typical weight for the arm system would be 4 pounds or so (without solenoid operated air valves), requiring a start force of 20 pounds and a stopping force of 40 pounds. If a stepping motor is used, the step rate at the required torque usually has to be limited to under 1500 steps per second, resulting in a drive pulley radius of 8.5 inches and a torque requirement of 8.5 in * 40 # * 16 oz/in /2=2700 inch ounces, not counting the torque required to accelerate the motor itself. In stepping motors, it is very difficult to keep the developed torque constant as the motor speed increases principally due to the switching time of the phases, hence the idea of a constant acceleration is not attainable. In addition, these requirements on the motor are almost physically unrealizable. Moreover, the extremely high G forces on the arm drive system during starting and stopping will result in very high stress levels on the bearings and cable, bringing about early failure of these items, not to mention the problems of primary and secondary resonances in the arm—motor spring mass system. Although a constant velocity system seems to be simple from the standpoint of predicting the cycle time, physical implementation is anything but simple.

Thus, labelling a moving object requires the ordering of many events, such as label printing and label applicator positioning for each package to be labelled, while the packages continue to move rapidly on the conveyor. The variability in package height, size and spacing, together with the varied data to be printed on the labels require significant system agility and responsiveness to keep pace with the flow of packages. The mere connection of individually available position detecting, printing, label positioning and label application devices, even if available for the specific task, cannot form an integrated system capable of responding to the varied requirements while matching the package conveyor flow volume typically encountered.

SUMMARY OF THE INVENTION

The present invention provides a label applicator and unified applicator system that is capable of labelling an object the height of which may vary considerably. Furthermore, the present invention labels the objects without having the applicator contact it physically. Still further, the present invention provides an applicator and system which will label the objects in a precise manner while they are physically moving at high speed past the applicator. In addition, the present invention provides an applicator system which will maximize object throughput while at the same time guarding against misapplication of labels and physical interference with said objects.

The system components according to the present invention include a system controller which enters packages into the system and buffers information to be printed, one or more package height detectors which measure the actual height of a package as it travels down the conveyor, one or more printer applicators which print and apply the labels to the packages as they pass by, and one or more encoders for measuring position and velocity along various sections of the conveyor.

As packages are transferred to the conveyor, their position on the conveyor is placed in a queue. The progress of the conveyor and hence the position of the package is continuously monitored. Information for the package is transmitted to the printer and a label is printed. The label is held in a mechanical buffer (label transport) until it is determined that the package for which that label is intended is present and that the label can be successfully applied. This determination is made by considering the heights and spacings of adjacent packages and the conveyor velocity. At this point, the printed label is expelled from the transport and placed on the applicator apply head, being held there by a retaining means described henceforth. When the position of the package on the conveyor is such that, at the present conveyor velocity, the time for the package to reach a selected printer applicator apply point in an apply zone on the conveyor is equal to the travel time of the application mechanism to reach the package, the applicator motion is initiated. The package height information is used to calculate the applicator travel distance. The applicator travels downward at high speed and is automatically stopped a short distance above the top of the package. An inertial mechanism causes the label to be propelled forward to the top surface of the package where the adhesive backing of the label is secured to the surface of the package by a momentary flow of air. The package is not contacted by the applicator head. The applicator is then returned to its home position to begin another cycle.

If the label cannot be applied successfully, the label is accelerated out of the transport at high speed, causing it to be propelled past the apply head and captured in a disposable container.

As each package passes out of the apply zone of the applicator, it is removed from the queue and the applicator monitors the progress of the next package in line.

The printer applicator system according to the present invention is designed to print and apply labels with variable data to packages of differing height traveling on a continuously moving conveyor at very high throughput speeds. According to the exemplary embodiment described herein, the system is capable of printing and applying labels at the rate of 3000–4000 per hour with conveyor speeds in the range of 0–400 feet per minute and a package height variance of 32 inches.

BRIEF DESCRIPTION OF THE DRAWING

These and further features of the present invention will be better understood by reading the following Detailed Description, taken together with the Drawing, wherein.

DETAILED DESCRIPTION OF THE INVENTION

Overall System

Figure 1:
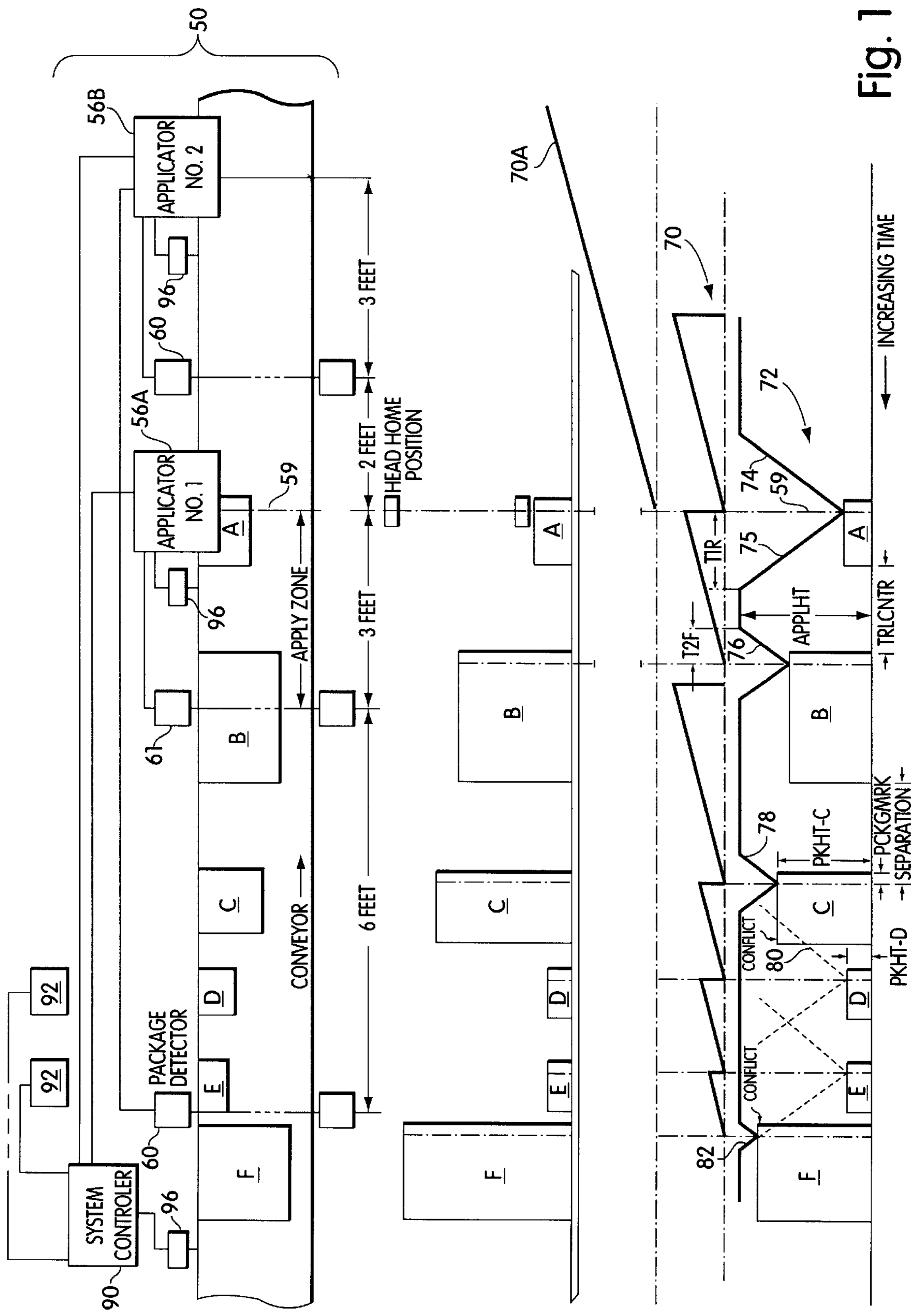
FIG. 1 is a block diagram of one embodiment of the system according to the present invention together with a timing diagram of various system parameters for objects as they move along the elements of the system pictured.

In an exemplary embodiment described further below with respect to FIG. 1, the label application system 50 comprises a system controller 90, one or more sources for package data 92, a conveyor 58 with device(s) 96 for measuring the motion of the conveyor, package presence and package height detectors 60, 61 and one or more printer applicators 56A, 56B . . . . The data source(s) are interfaced to the system controller 90, as is a package presence or height detector and the conveyor motion measurement device. The system controller 90 is interfaced to the printer applicator(s) 56A, 56B . . . in order to control the flow of data to the printer applicator in accordance with the arrival of packages. The package height 61 or presence detector 60 and conveyor motion measurement device 96 are interfaced to the printer applicator(s) 56A, 56B . . . and the system controller. In alternate embodiments, the system controller may in fact be part of the printer applicator.

Figure 5A:
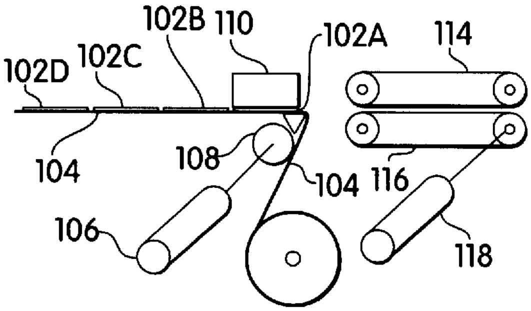
FIG. 5A–5E are simplified side views of the printer head, label buffer and applicator arm assemblies in several modes of operation according to one embodiment of the present invention.

The printer applicator 56A, 56B comprises a high speed label printer 110, FIG. 5A), a servo controlled transport mechanism FIGS. 7A–7E) for buffering and moving a printed label between the printer and an inertially operated applicator head (FIGS. 8A–8C) and a servo controlled high speed movable arm (FIGS. 6A–6E) coupled with the applicator head for moving the label down to the package and applying it.

According to the preferred embodiment, the printer applicator prints the label when signalled by the system controller (unless presently printing or otherwise occupied) and positions the label part-way into a transport mechanism that serves as a buffer between the printer and the applicator. The label is held there pending a determination of the ability to apply it successfully.

If a label can be applied successfully, the label is brought out of the transport and positioned on the applicator head where it is captured and held in place by a positive air stream directed towards the face of the head. Once the label is in place on the head, the printer is free to begin another print cycle. The transport buffer thus serves to permit the apply cycle time and the print cycle time to overlap substantially, thereby markedly improving overall throughout.

If a label cannot be applied successfully, the encapturing air system is disabled and the label is accelerated at high speed out of the transport past the applicator head to a waste container.

The label applicator system via the system controller simultaneously monitors the presence of packages on the conveyor through the system controller package detector as well as the motion of the conveyor. The system controller detector is located sufficiently far upstream from the applicator to insure that the data can be transmitted and a label printed and applied at the highest conveyor speed after the package is detected. When a package is detected on the conveyor, the printer applicator opens a time window and looks for a message from the system controller. This message, if present, is then associated with the specific package on the conveyor and its position on the conveyor, and the package is then entered into a queue in the applicator controller. This package is then tracked by the applicator controller as the package progresses along the conveyor. The message is transferred to the printer early enough to insure that it can be printed on a label in time for the label to be applied to the package. If for any reason the label cannot be printed, the message is aborted, the package is removed from the message queue and the system controller is notified. In labelling systems of this nature, it is generally preferable to let an object go through unlabelled rather than mislabel it or stop the conveyor. In general, unlabelled packages are detected downstream and replaced on the conveyor before the detector 60 to be recycled through the system. Alternatively, the conveyor motor (not shown) speed could be modulated by the controller 92 in such a way as to assure adequate print and apply time.

The second package (height) detector 61 associated with the applicator is located sufficiently upstream of the applicator to detect the presence of a package in time to initiate the applicator arm movement with sufficient lead time to compensate for the travel of the package along the conveyor during the arm travel time. In alternate embodiments, the second package detector in some embodiments can in fact be the same physical unit as the first package detector, the system controller and applicator thus sharing the same resource.

The printer applicator package detector is usually, but not necessarily, a height detector, as described in copending patent application entitled "Package Height Detector", (Attorney's Docket No. IMT7) filed on even date herewith, and incorporated by reference. As soon as the applicator package detector detects the presence of a package at the apply zone, the applicator checks for the presence of a valid printed label for a package in that position on the conveyor. If so, the package height information, which is required, however obtained, is used to determine the possibility of actually labelling the package by calculating the separation between the prior and present packages and determining whether an apply cycle can be successfully executed without any mechanical interference between any of the packages and the arm during its apply cycle. Alternatively, the package height may be measured at the system controller and transmitted to the applicator along with the data to be printed, or it can be measured at the applicator. In some embodiments, it may be desirable to do both and have the applicator verify that the two height measurements are in agreement, rejecting the label if they are not.

A diagrammatic representation of these concepts is depicted in FIG. 1, wherein the possible approximate physical layout of the conveyor is shown in the upper half 50 of the figure. The position and timing relationships are shown in the lower portion 52. In the lower portion of the figure, the horizontal axis 54 shows progress along the conveyor in time. Time should be viewed as increasing to the left (←) in units that are proportional to the conveyor velocity. The timing portion shown in the figure relates to Applicator #1, wherein other applicators, e.g. 56B, have correspondingly analogous timing considerations.

Packages are identified as A, B, C and so forth. The top of portion 52 of the diagram (70A) shows the distance of the first package A from the first applicator 56 beginning at the time when it is first detected by the first height detector 60. The distance decreases with time (forward motion of the conveyor) until it is equal to the distance between the applicator package detector 61 and the first applicator 56A apply point 57. The ability to apply a label successfully is determined. If a valid label, that is, one that has been printed and is destined for this package, exists and if it can be applied successfully, the applicator cycle will be initiated. If there is no label for the package or if the label cannot be successfully applied, the package will simply pass by. In the figure, it is assumed that valid labels exist for all packages.

The distance between any package and the applicator apply point once the package has entered the apply zone 58 is shown as the third diagram 70 in FIG. 1. As this distance of the package to the applicator decreases, a point occurs where the arm motion must be initiated in order to apply the label on target. The next region 72 in the figure shows the motion of the applicator arm (126) during an apply cycle. As can be seen in FIG.1, the apply cycle for package A (74) can be completed without interference and hence it would be executed. Package B, being a higher package, requires a shorter apply cycle (76) and it too will be executed. Package C apply cycle (78) is even shorter and it too would execute.

Package D illustrates two problems. The dotted line 80 shows the applicator cycle that would be required to label package D successfully. The starting point of the cycle would have to occur prior to the completion of the cycle for package C and hence it would be disallowed. Further, even if this were not the case, the forward part of the cycle 80 for package D would interfere with the trailing edge of package C and hence it cannot be allowed.

Package E illustrates yet another problem. If package D had been labelled, package E could not be labelled since a new arm cycle could not be initiated in the time following that for package D. Since package D was not labeled, however, package E is free to be labeled as far as interference from package D is concerned, but package F presents a problem in that the arm on the return stroke from labeling package E would be struck by the leading edge of package F. Since the height and position of package F were not known as package E was being analyzed, package E would be marked as labellable. However, as soon as package F arrived, the conflict would be recognized and the label for package E would be rejected. Package F would then be labeled in the normal way.

It should be noted that, while the objective is to label all the packages correctly, there is a certain dependence on any system that objects be presented in an orderly manner to achieve this objective. However, in the real world, while most of the time things are orderly, occasionally things go awry. A properly functioning reliable system should be able to cope with random disorder and opt for the best outcome. Hence the emphasis on preventing mechanical interference between applicator and packages as well as the adopting the strategy that no label is better than a mislabel. Moreover, according to a further inventive feature of the present invention relating to the servo control of the applicator arm discussed below, the arm motion (74, 75, 76, 78, 80, 82) will be of a higher order, e.g. parabolic, and is illustrated as linear in FIG. 1 for simplicity and as an alternate embodiment of the present invention.

The label applicator system according to the present invention can be configured in a number of different ways. An elementary system comprises a single printer applicator operating in conjunction with a package height detector and a source of data. According to a further embodiment of the present invention, two printer applicator system units (56A, 56B) can be employed in tandem to improve system labelling availability. The system controller monitors the status of each. Normally the system controller operates with only one applicator, sending all messages to it until it reaches a low stock condition. At this time, the system controller switches over to the second unit, which presumably is loaded and ready to go. In this way, a low stock condition does not cause an interruption in system performance. The operator then has a reasonable amount of time to replenish supplies before the unit will be required again.

If both units are actively on line, the system controller 90 will stay with one unit as described above unless it finds a condition in which the unit with which it is operating cannot complete an apply cycle due solely to timing consideration and not mechanical interference. Under these conditions, it will pass off the second label to the other printer applicator, returning to the first applicator for the third label, thereby maintaining throughput as high as possible.

Figure 2:
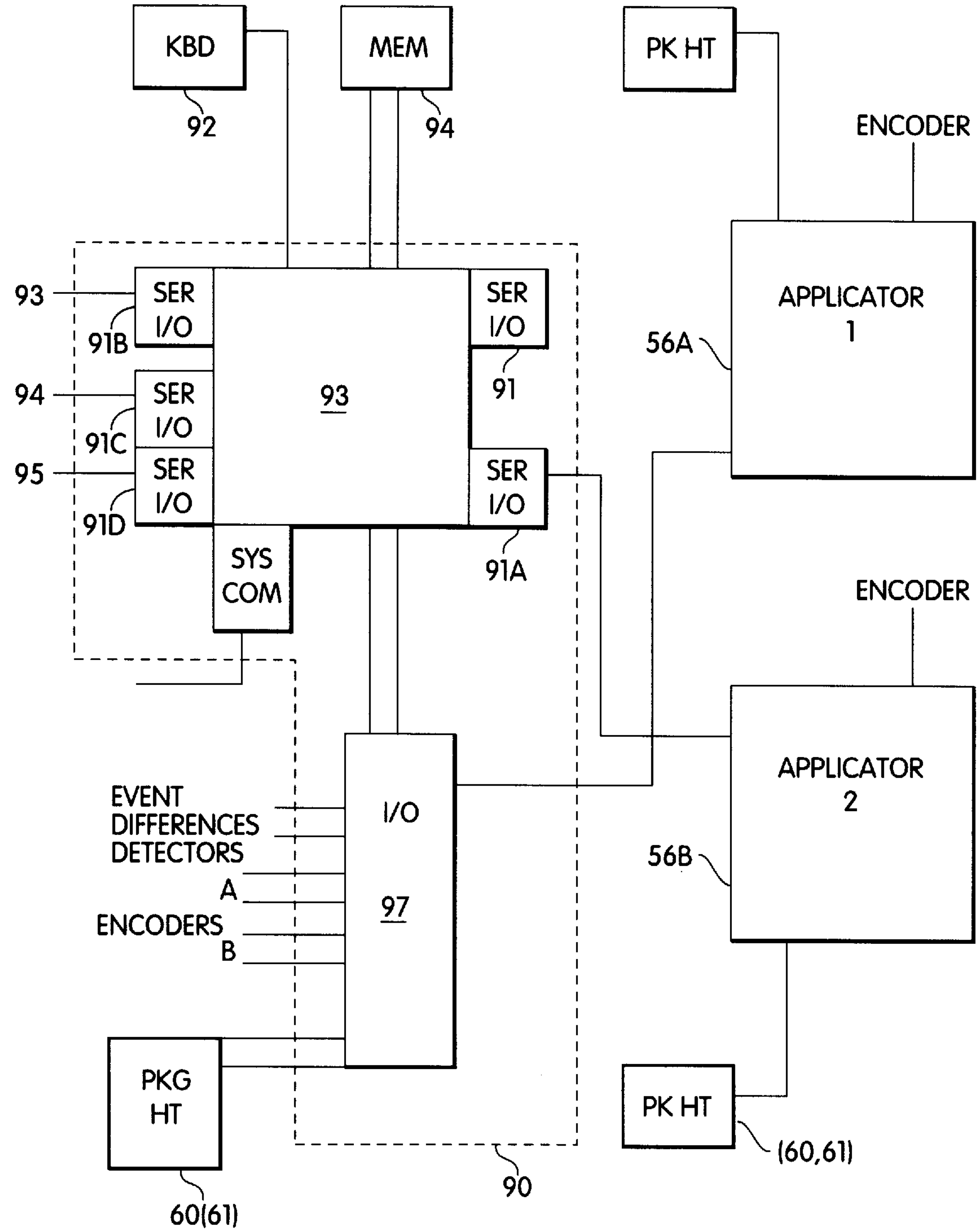
FIG. 2 is a block diagram of the entire control system according to one embodiment of the present invention.

A block diagram of the system controller 90 is shown in FIG. 2. A serial I/O circuit 91 interconnects the data source (s) 92 and the applicator(s) 56 (and other serial I/O devices, not specifically identified) to a programmable processor 93. Similarly, a parallel I/O circuit 95 connects the package presence or height detector(s) 60, conveyor sensor(s)96 and other parallel I/O devices (not shown) with the programmable processor 93. The programmable processor typically comprises any of the presently available microprocessor or computer devices, having in association a memory 94 for storing the program control and related data. In particular, digital signal processors as described below are well suited to this application due to the ease of interfacing to conveyor shaft angle encoders, particularly where there might be several sections of conveyor between the controller and the applicator, each operating at different not necessarily constant speeds including stopping and accelerating while a package is in progress.

Figure 3:
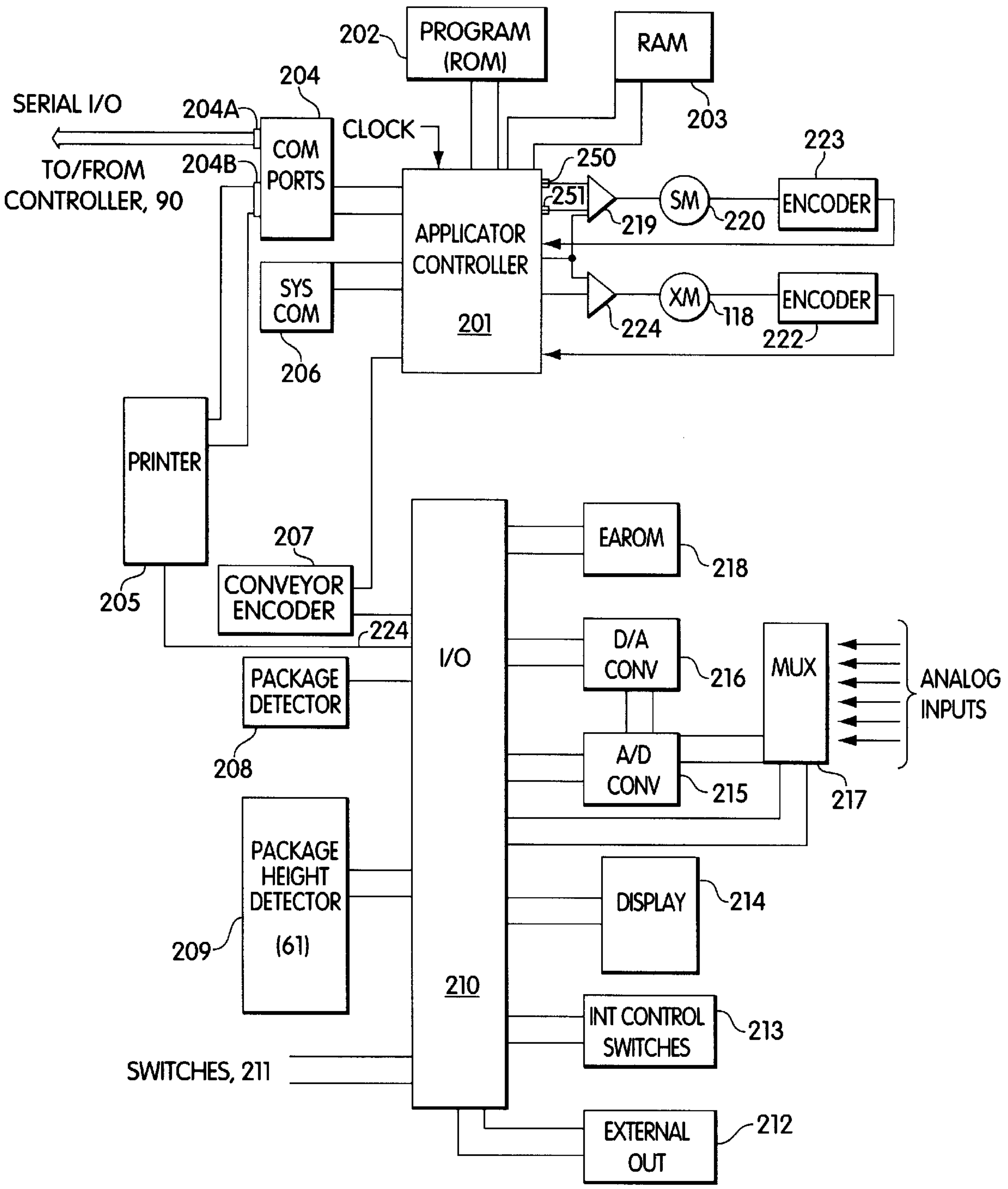
FIG. 3 is a block diagram of the applicator according to one embodiment of the present invention.

A block diagram of the applicator 56 is shown in FIG. 3. A programmable processor 201 is used as the internal controller. The programmable processor can be any of the microprocessors presently available with sufficient speed, but is best handled with the type known as digital signal processors, optimally those designed for control system applications. Such devices include the TMS320C14 series as manufactured by Texas Instruments, Inc. In addition to general purpose I/O and very high speed processing, devices of this sort feature direct timing interface to shaft angle encoders and internally controllable pulse width modulators suitable for direct control of servo and stepping motors. These devices make possible direct software control of servo algorithms without analog components and with a significantly reduced external parts count.

The processor 201, as the applicator controller, interfaces to two (or more) serial I/O ports 204A & 204B. One port (204A) connects to an external data source to obtain label information to be printed. The second port (204B) connects to the printer 205 The timing and formatting of information to the printer can thus be controlled by the processor 201. Another serial port 206 (SYSCOM) is used as a system control port for diagnostic testing and maintenance, either locally or remotely.

Various peripherals are interfaced to the processor through a parallel I/O structure 210. These peripherals include the printer stepper motor state 224, package detector (s) 208 (60), the package height detector 209 (61), various control and limit switches 211, internal control switches 213, a multicharacter display 214, external signal or relay closure outputs 212, a multiplexor 217 and A/D converter 215, a D/A converter 216 and a serial EAROM 218.

Figure 10:
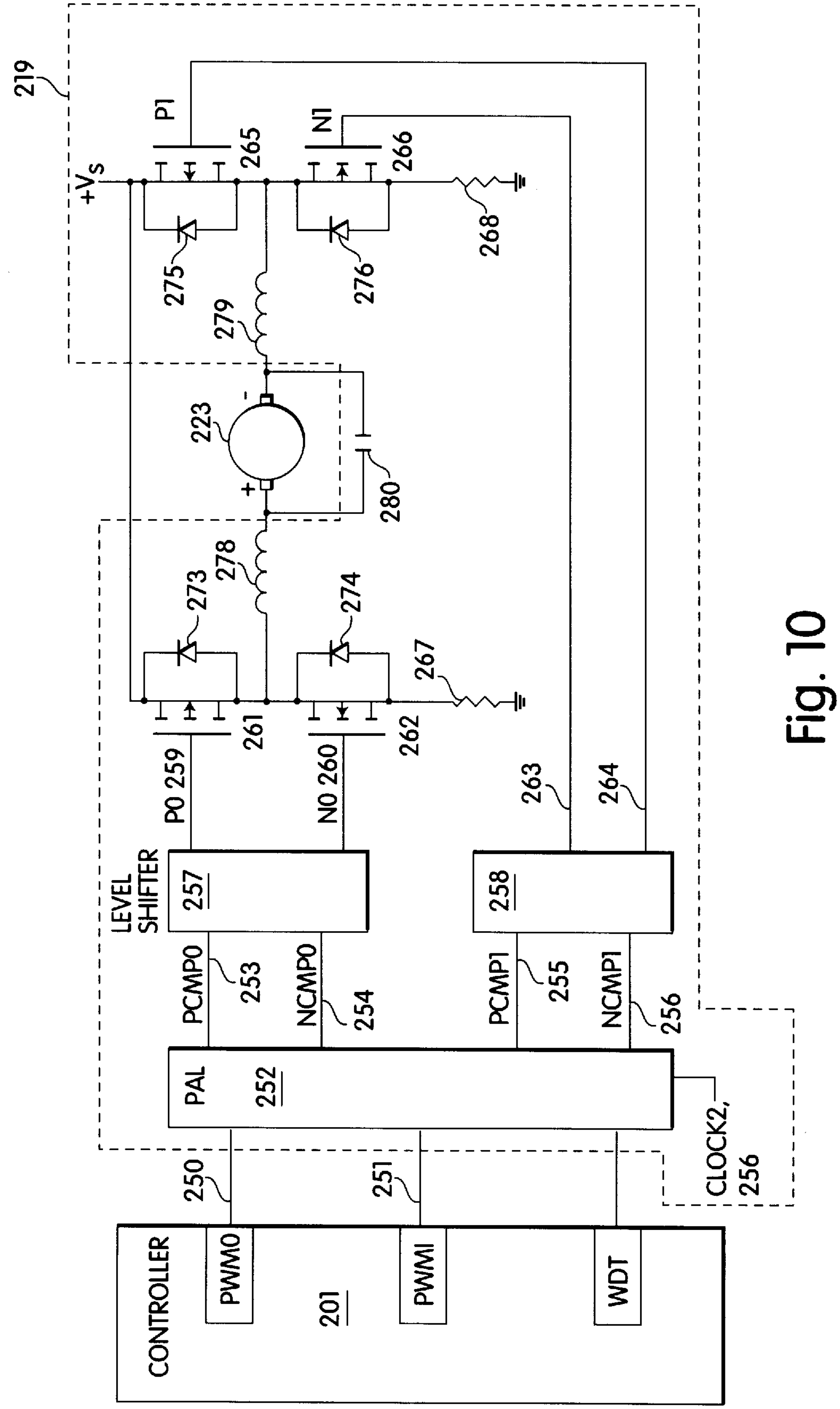
FIG. 10 is a schematic view of a typical servo amplifier.
Figure 10A:
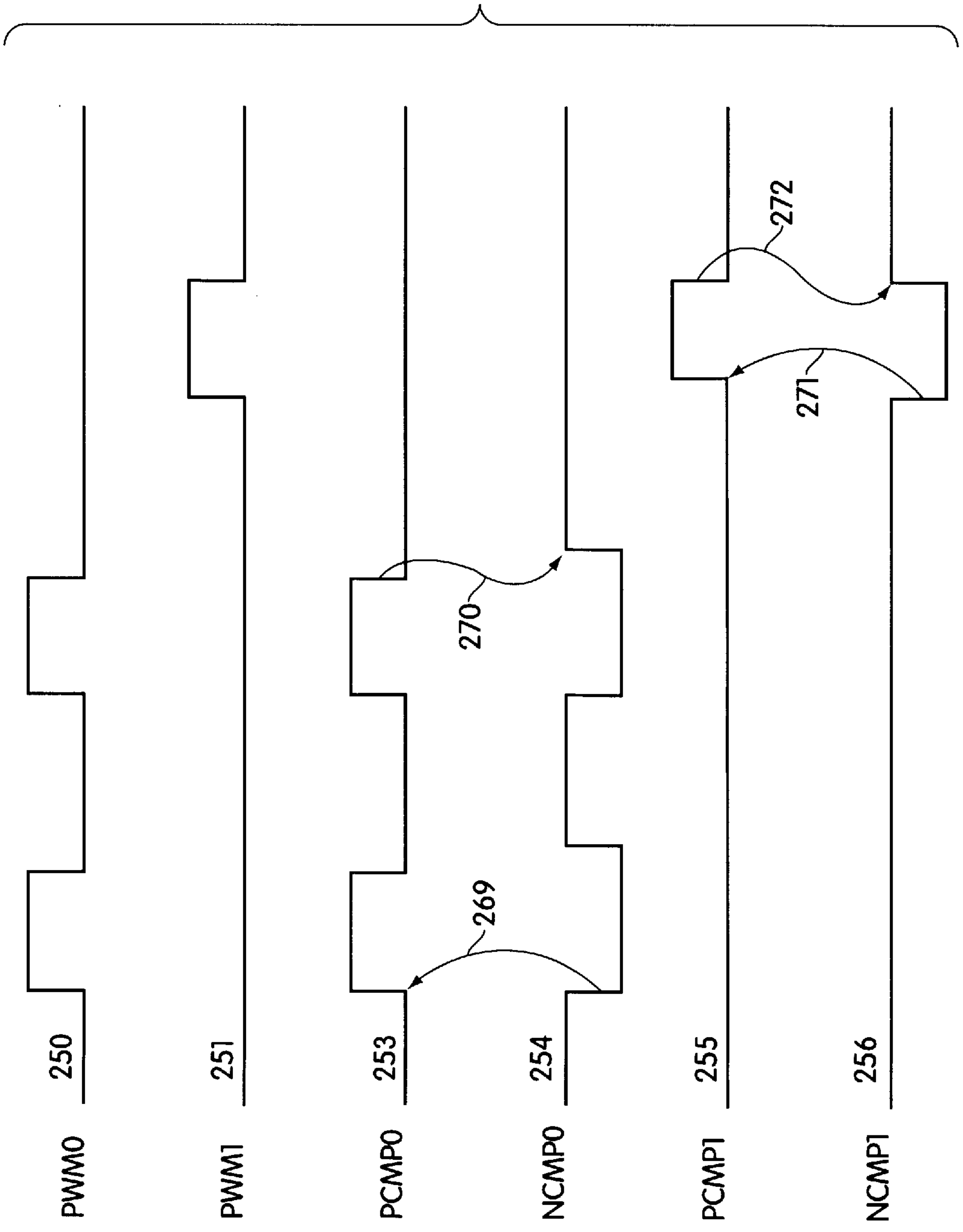
FIG. 10A is a timing diagram of signals generated within the servo amplifier of FIG. 10.

In the optimum embodiment of the processor, the pulse width modulator outputs of the controller 201 are directly connected to power amplifiers 219 and 224 (FIG.10). These amplifiers control the servo motors for the applicator arm 220 and the transport 221. Shaft angle encoders 223 and 222 feed back the position of the respective motors to the processor 201 through inputs that recognize not only the states of the encoder but also the time of occurrence of a change in state. One or more conveyor encoders 207 are similarly interfaced. The memory-resident program 202 performs all the functions of monitoring data and package position, controlling all the peripherals and supervising the operation of the servo control systems. In addition, the program 202 compares the actual servo motor positions with their reference positions, calculates the gain and damping terms required to stably reduce the error to zero and adjusts the width of the pulse width modulator outputs 219 and 224 accordingly, thereby implementing two closed loop servo control systems.

The display 214 is used to convey operating information to the user. The EAROM is used to store various constants unique to the installation. The A/D converter 215 monitors various analog sensors in the system. The D/A converter 216 is used in conjunction with the system control port for dynamic display of internal system states on an oscilloscope.

One embodiment of the present invention is operable according to an exemplary control process resulting in a series of steps as shown in FIGS. 5A–5E relating to the printing of the labels to the application of the printed label on the package. In the FIGS. 5A–5E, the labels 102A–102D are carried on a web or liner 104 by a motor 106 driven roller 108 wherein the position of the label 102 relative to a printhead 110 is sensed by a control element (not shown) wherein the label is selectively printed according to the controller 90, FIG. 5A.

Figure 5B:
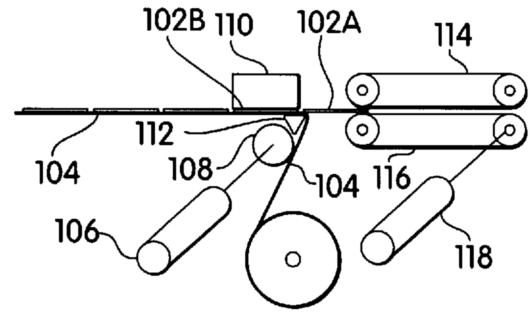

While the label 102A is being printed, the transport 115 is placed in sync mode, wherein the transport operates in position synchronism with the printer. Referring back to FIG. 3, the printer motor phase sensor 224 provides the position information to the controller 201 , which controller in turn controls the servo motor 118 of the transport to accomplish said synchronism. In FIG. 5B, the printed label 102A is separated from the liner 104 by traversing a strip bar 112 at a sharp angle whereupon the adhesive backing of the label 102A pulls away from the liner 104 allowing the label 102*a* to continue in a forward direction extending beyond the liner 104 and the strip bar 112 until captured by a set of upper and lower transport belts, 114 and 116, shown in FIG. 5A.

The upper and lower transport belts 114 and 116 form a label buffer, which is controllably driven by a motor 118. After the printed label 102A engages the upper and lower label transport belts, 114 and 116 respectively, and after the printer has stopped printing the label, the label is completely supported by the belts 114 and 116. The trailing edge of the label is located just before the strip point 112 position as shown in FIG. 5B.

Figure 5C:
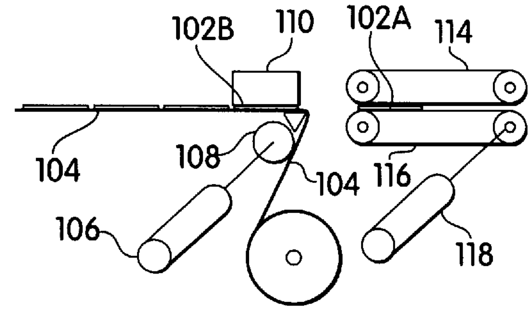
Figure 5D:
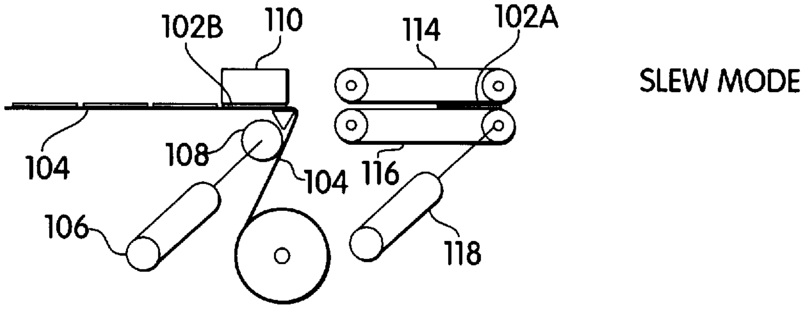

As soon as the printer stops, the label buffer motor 118 causes the label buffer 120 to move the printed label 102A a distance sufficient to completely disengage the label 102A from the label liner 104 and be contained within the label buffer 120, FIG. 5C. This is referred to as the park position.

When the determination has been made (as described elsewhere) that the box 130 may receive a label, the printer buffer 120 is put into the slew mode whereby it transports the printed label 102A a fixed distance, thereby causing the label 102A to be received by the head 124 of the applicator 126 under the control of the air deflector 936.

If it is determined that the label may not be placed on the package, the air deflector 936 is turned off and the printer buffer 120 is placed in the said slew mode but the ejection distance is made significantly longer than the fixed distance from the park position in the transport to the applicator head. This causes the label 102A to be ejected by the transport at a high rate of speed. This high exit velocity coupled with the absence of deflecting air from the deflector 936 causes the printed label 102A to pass by the applicator head 124 completely and continue on to be received by a receptacle 136, such as a disposable plastic bag.

When either of these slew modes has been completed, the label buffer (transport) is now empty and free to begin a new print cycle. If the label 102A had been loaded onto the head 124, the applicator is placed into a ready to apply state and the applicator arm 126 can be controllably extended at the proper time to apply the label 102A to the package 130 as disclosed elsewhere. Following application of the label, the applicator arm 126 is withdrawn to its at rest position.

As the applicator progresses through the aforesaid apply cycle, the transport can simultaneously be sequenced through all the steps 5A–5C as described above. The present invention is not limited as to the particular sequence or size of labels or the necessity that the sequence of labels printed be applied to sequentially ordered packages.

Figure 5E:
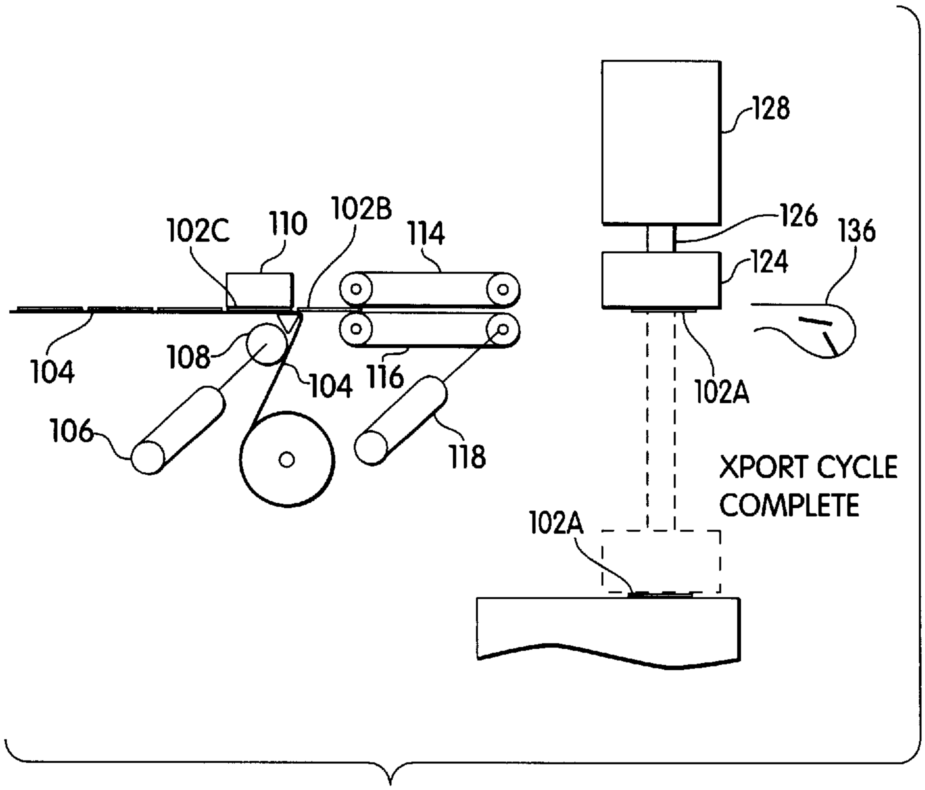
Figure 5F:
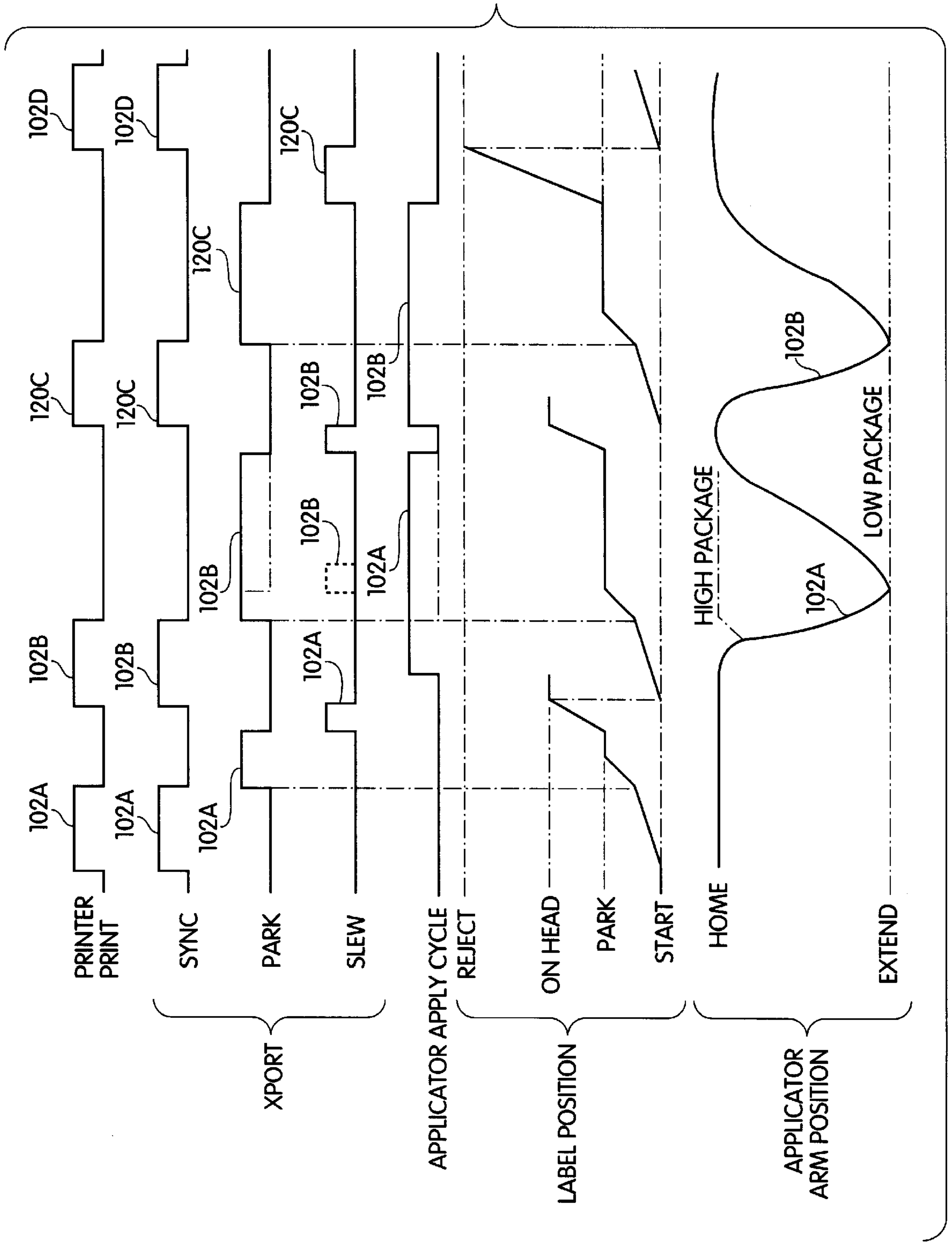
FIG. 5F is a timing diagram of the embodiment shown in FIGS. 5A–5E.

FIG. 5F is a timing diagram depicting the overlap of cycle times possible with this arrangement. The cycle times shown are relative, but in approximate ratiometric proportion to that which is physically realized. During the printing of label 102A, the transport is in sync mode as shown. The applicator is assumed to be idle. When the printer stops, the label is brought to the PARK position. When a package arrives and assuming it is labellable, the label is then brought out of the transport onto the head in slew mode. As soon as the label 102A is on the head, the printer can begin printing the next label 102B. The applicator apply cycle is initiated at any time following the placement of the label onto the head consistent with the package position and the conveyor velocity. In this way the printing of label 102B can occur concurrently with the application of label 102A. When the applicator completes the cycle for 102A and of the package for label 102B is labellable, label 102B is slewed onto the head. Label 102C can now be printed simultaneously with the application of label 102B, and so forth.

The position of each label relative to the print head is shown in the figure. Once a label is completely processed, the next label can be printed. As soon as label 102A is on the applicator head, the printing of label 102B can begin. For illustrative purposes, it is assumed that label 102C cannot be successfully applied and hence is rejected as soon as the apply cycle for label 102B is complete. When the rejection cycle is complete, label 102D can be printed.

The applicator arm position is also shown in FIG. 5E. The solid lines indicate the arm stroke for the minimum height package. The dotted line indicates the position for a high package. Note that the entire control scheme is asynchronous, that is, any given event can take place as soon as a prior event has been completed. For example, the label 102B will be placed on the head immediately following the completion of the apply cycle for label 102A as shown by the dotted lines, assuming all other conditions are met.

In the prior art, label printing and stripping occurred as one step followed in time by label application as a second sequential step. The total cycle time to print and apply a label was thus the sum of the individual cycle times. In the present invention, the total cycle time is the longer of either the print or apply times plus the overlap time to remove the label from the transport. This latter transport time can be made selectively small relative to either of the other two times. By way of example and not intending to limit the scope of the invention in any way, a typical print cycle time is in the order of 400 milliseconds and a typical apply cycle over the average height range of the present embodiment is in the order of 600 milliseconds. The present transport is capable of placing the label on the head from the park position in 70 milliseconds. Thus the average cycle time for one embodiment of the present invention is in the order of 670 milliseconds which yields a throughput of 1.5 labelled packages per second or 5400 per hour. This is in contrast to prior art systems with cycle times of 1000 milliseconds yielding a throughput of 3600 per hour. The net productivity improvement is thus 50% using the teaching of the present invention. It is to be noted that the present invention will always yield a higher throughput than prior art systems regardless of improvements in print or apply cycle times, since any improvement in either the print or apply cycle times can be exploited by either art, the performance of the prior art always being subject to the sum of the times and that of the present art principally governed by the longer of the two.

Figure 4A:
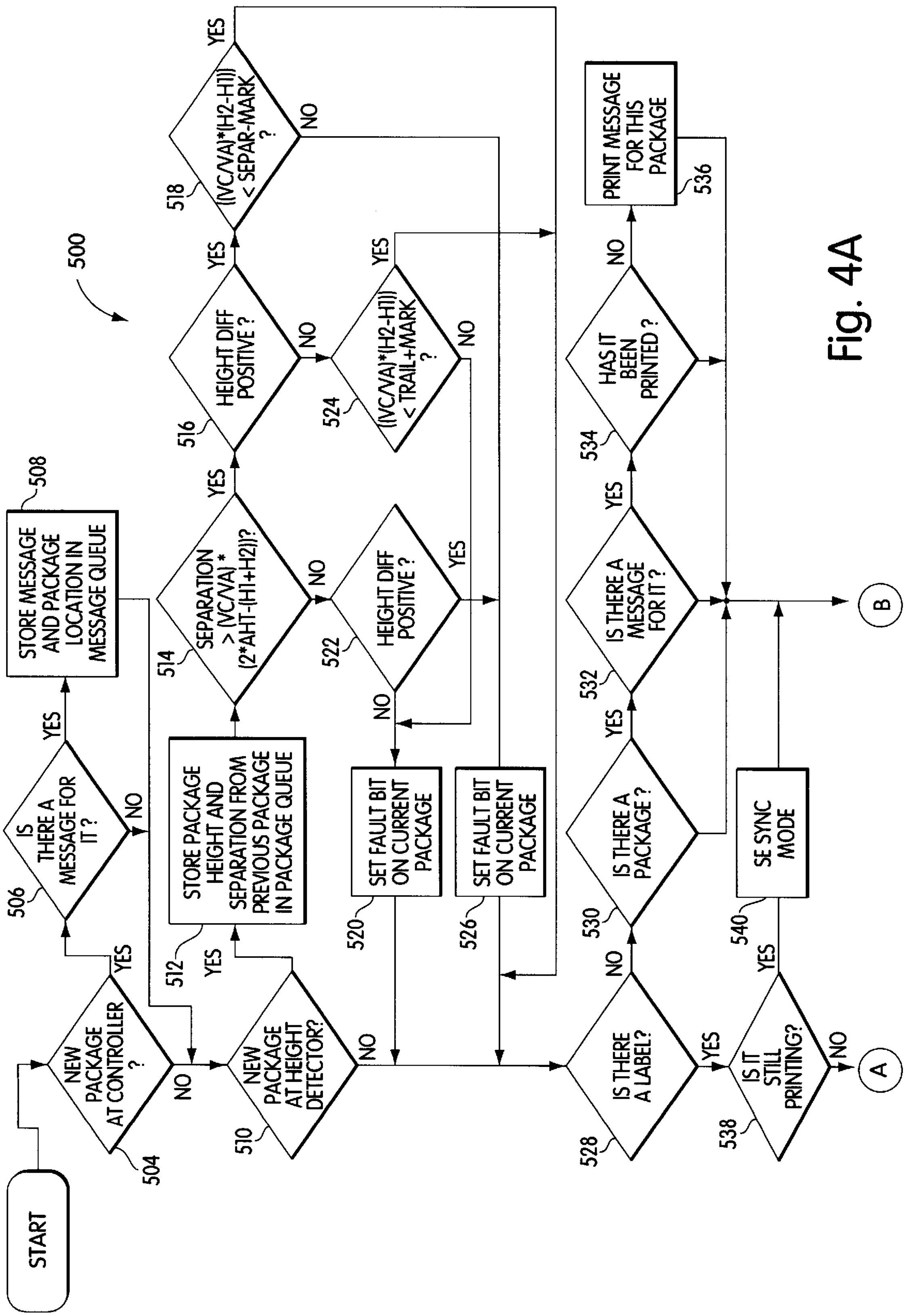
FIG. 4A and FIG. 4B together form a flow chart of the applicator operation according to one embodiment of the present invention.
Figure 4B:
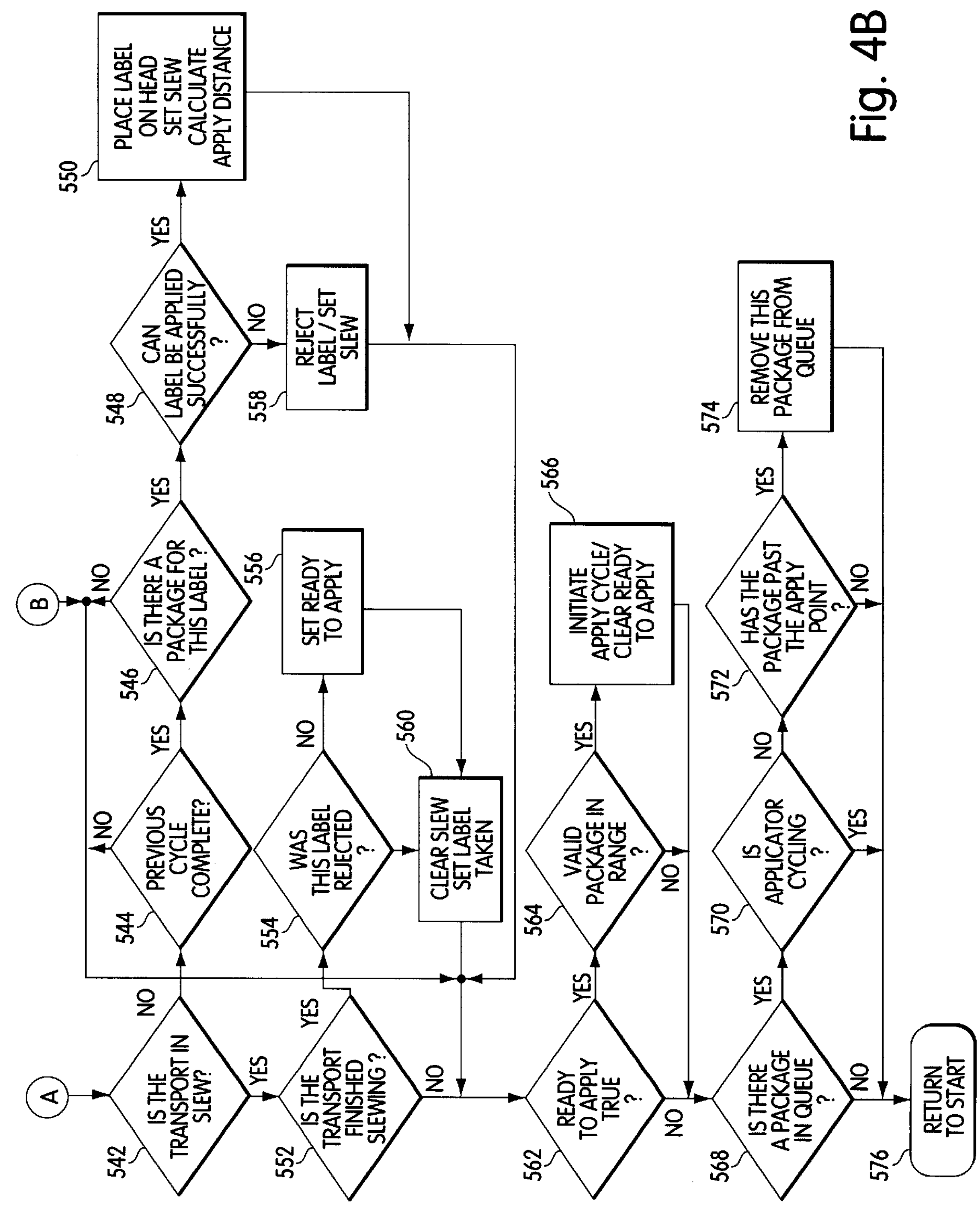

The operation of the applicator according to one embodiment of the present invention is shown in a flow chart 500 in FIG. 4. This flow chart is broad in scope and omits many of the details of operation for the sake of clarity. In particular, the flow chart depicts the background portion of the control program that is essentially event driven. It does not show the real time or hardware control of such items as the package height detector, servo systems and the like. The program flows in a loop, beginning at the start Step 502 and ending at step 576 which returns to step 502.

At Step 504 it is determined if a new package has arrived at the system controller. If so, at Step 506 it is determined if there is a message associated with this new package that calls for a printed label. If this is so, then the present location of the package on the conveyor and the contents of the message are entered into a message queue in step 508.

In Step 510 it is determined if a new package has arrived at the package height detector. If so, the position of the new package on the conveyor and the separation of the new package from the previous package are entered into a package queue at Step 512. It should be noted that the package queue and the message queue are different queues, but that each queue contains the location of the package on the conveyor at the time the entry was made into the particular queue. This means that the data for the package label can be entered into the system at a physical location that is different from where the applicator height detector is located. The height detector is serving as both a package detector and a height detector for this applicator in this example. Alternatively, the height could be detected at 504 and stored with the position in 508.

Once the location and height are entered in the package queue, it is determined if the present package is separated from the previous package by at least the minimum distance to allow the previous apply cycle to finish and the present apply cycle to label the present package. In the step, VC=conveyor velocity, VA=arm velocity, AHT is the height of the applicator head at rest above the conveyor, H1 is the previous package height and H2 is the present package height. The minimum separation is determined from the conveyor velocity times the sum of the arm return time from labelling the previous package plus the arm forward time for labelling the present package. These times are shown as T1R and T2F in FIG. 1 and are calculated as (AHT-H1)/VA and (AHT-H2)/VA respectively. Reducing the equations produces the form of the expression shown in Step 514. If the separation is inadequate, it is determined in Step 522 if the present package is taller than the previous package. If so, the previous package is marked as being unlabellable in Step 526. If not, the current package is marked as being unlabellable in Step 520.

If the minimum separation is adequate from a cycle time viewpoint, it is next determined if the spacings are sufficient from the standpoint of collisions. To do so, it is first determined in Step 516 if the present package is taller or shorter than the previous. If taller, (height difference positive), a test is made in Step 518 to determine if the C–D or E–F conflict shown in FIG. 1 as the applicator return path 82 exists. This step calculates the time TR it takes for the applicator arm to travel from H1 to H2 as (H2-H1)/VA. It then calculates the distance that the package will travel during this time as TR*VC. The actual distance between the apply point of package 1 and the leading edge of package 2 is given as the separation between packages (SEPAR) less the leading edge offset to the apply point (MARK) 59. Reducing the equations produces the form shown in Step 518 of FIG. 4. If the package motion is less than this actual distance, the package is allowed as entered, if not, the previous package is marked as unlabellable in Step 526. If the present package is smaller, height difference negative, it is then determined in Step 524 if interfering with the trailing edge of the previous package which is the conflict shown as the applicator path 80 in FIG. 1 exists. To do so, the time TA it takes for the applicator to traverse from the height of the previous package to the height of the current package is calculated as (H2-H1)/VA. The motion of the package along the conveyor during this time is given as TA*VC. The spacing between the trailing edge of the previous package and the leading edge of the present package (TRAIL) plus the leading edge offset to the apply point (MARK) is then compared to said motion. If the said motion is greater than the spacing, the present package is marked as being unlabellable in Step 520, else the package is allowed. For simplicity, an average arm velocity VA is used in the calculation, the average being chosen low enough to assure non impact.

It is next determined in Step 528 if there is a label being processed. If not, it is determined in Step 530 if there is a package currently in queue. If so, it is determined in Step 532 if there is a message for this package. If so, it is determined in Step 534 if the printing of the label for this package has been initiated. If not, transmission of the message to the printer is initiated in Step 536.

If Step 528 determines that a label is in process, it is next determined in Step 538 if the printer is actively printing the label. If so, the transport is placed into SYNC mode, step 540, whereby it operates synchronously with the printer in order to accept the label from the printer with no relative motion between the transport drive belts and the label adhesive surface.

If Step 538 determines that the printer has finished printing the label, it is next determined in Step 542 if the transport is in SLEW mode. If not, it is determined in Step 544 if the previous apply cycle is complete and if the previous package has traveled past the applicator apply point. If so, a further test is made in Step 546 to insure that the position of the package on the conveyor for this label is consistent with the actual position of the current package. If this is not the case, the current package is ignored. If true, a test is made, Step 548 to determine if the label can be applied successfully. This test first examines the entry in the package queue to insure that the package was not marked as unlabellable in the prior steps 520 or 526. The test also determines if the present distance of the package from the apply point is greater than the apply time times the conveyor velocity ((AHT-H)/VA)*VC. If both conditions are met, the transport is set into SLEW mode and instructed to position the label on the head. The apply distance for this package is calculated.

If either condition is not met, the transport is set into SLEW mode and instructed to place the label far beyond the apply head. The encapturing air stream is disabled, thus causing the label to be rejected from the transport and subsequently caught in a disposable container.

If Step 542 determines that the transport is in SLEW mode, it is next determined in Step 552 if the transport has finished slewing. This is ascertained by comparing the transport servo actual position to the reference position. When this difference is within a predetermined limit, it is determined in Step 554 if the slew was to place the label on the head or reject it. If the label was placed on the head, Ready to Apply is set in Step 556, thereby indicating both internally and externally that a label is on the head and the system is ready to apply it. SLEW mode is then cleared in Step 560 and Label Taken is set, thereby indicating that another label can now be processed.

The state of Ready to Apply is determined in Step 562. If true, the existence of a package and its position relative to the apply point are tested in Step 564. When such position is less than or equal to the time it takes to apply the label times the conveyor velocity (DST<=((AHT-H)/VA)*VC), the applicator apply cycle is initiated and Ready to Apply is cleared in Step 566. The apply time calculation ((AHT-H)/VA) is shown in this form for clarity, but is in fact more complex than indicated since the arm velocity VA is not a constant. Any error in calculating the conveyor lead distance will result in a placement error as far as the position of the label on the package is concerned. Similarly, any variation in the performance of the arm drive system from the predicted values will cause placement errors. The method of minimizing these errors in the instant embodiment is discussed below.

It is next determined in Step 568 if there is a package in queue. If so, it is determined in Step 570 if the applicator is still cycling. If not, it is determined in Step 572 if the package under consideration has yet gone beyond the apply point. If this is so, the package under consideration is removed from the queue and the next package in queue, if it exists, will now be examined in the various steps discussed heretofore.

Step 576 returns to Step 502 to begin the cycle again. As noted earlier and as shown on the Flow Chart FIG. 4, the program flows in a loop continuously, never stopping or pausing at any one step. The actual program will typically pass many thousands of times through the flow chart 500 of FIG. 4 as it awaits the various conditions for which it is testing.

Transport

Figure 7A:
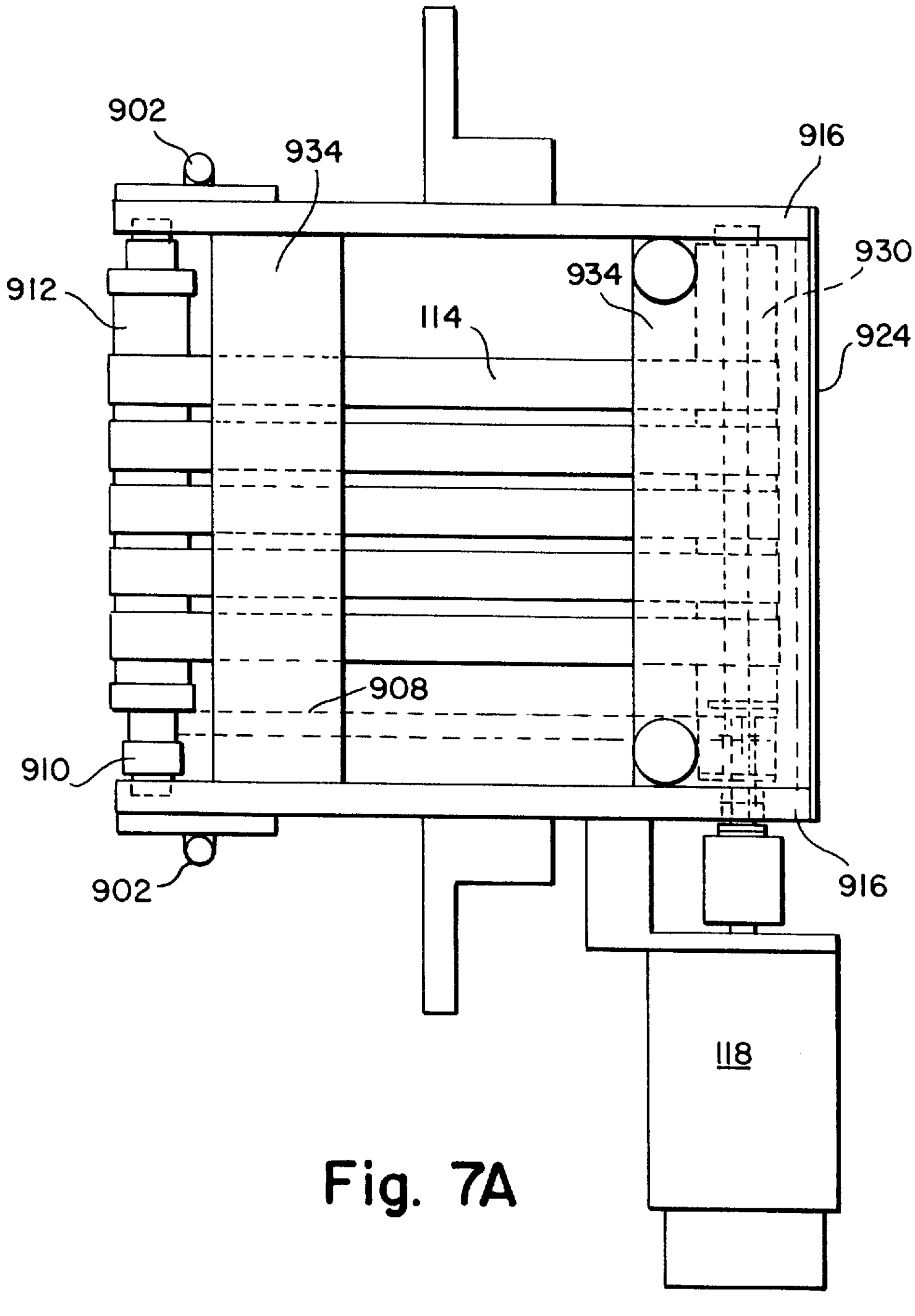
FIG. 7A–7E are plan and elevational views of one embodiment of the transport of the present invention.
Figure 7B:
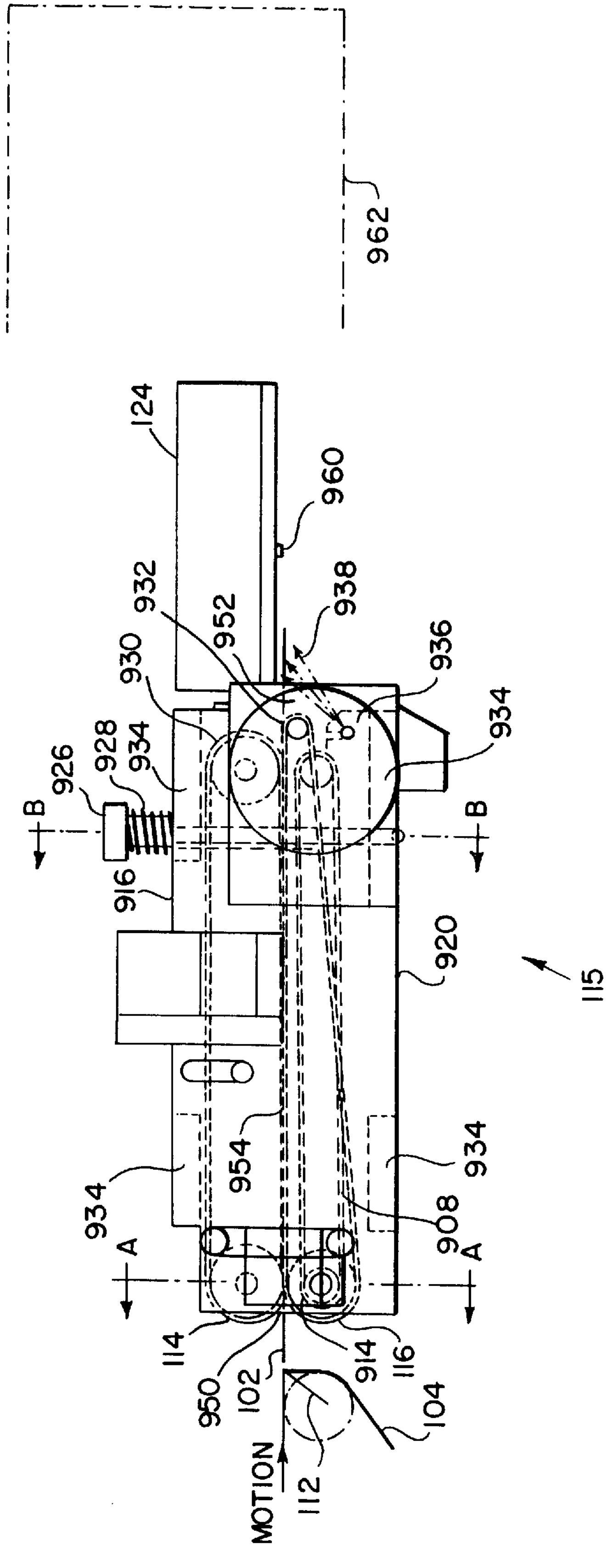
Figure 7C:
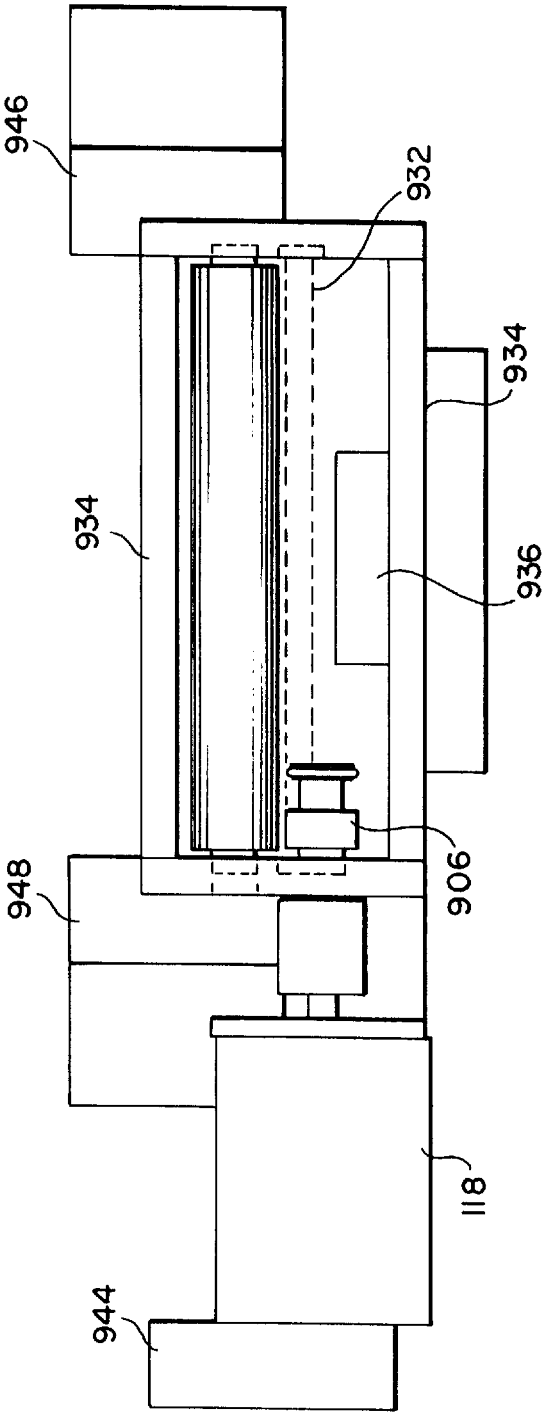
Figure 7D:
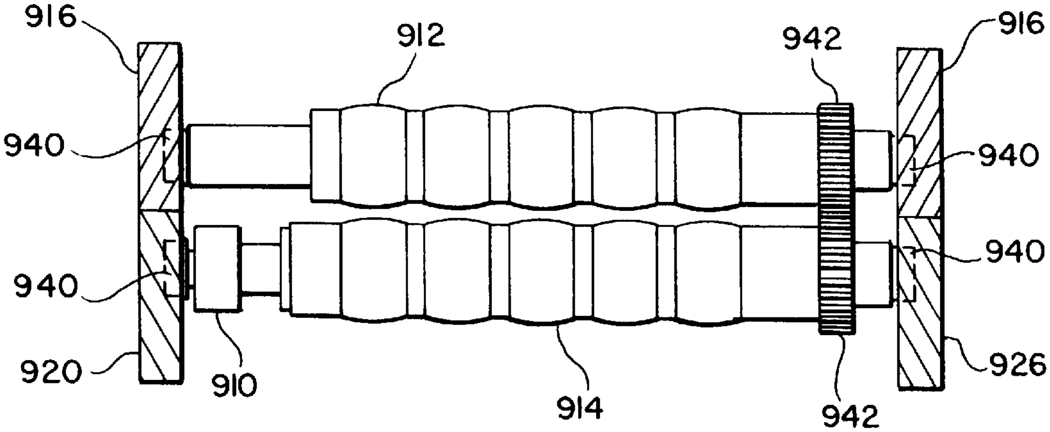
Figure 7E:
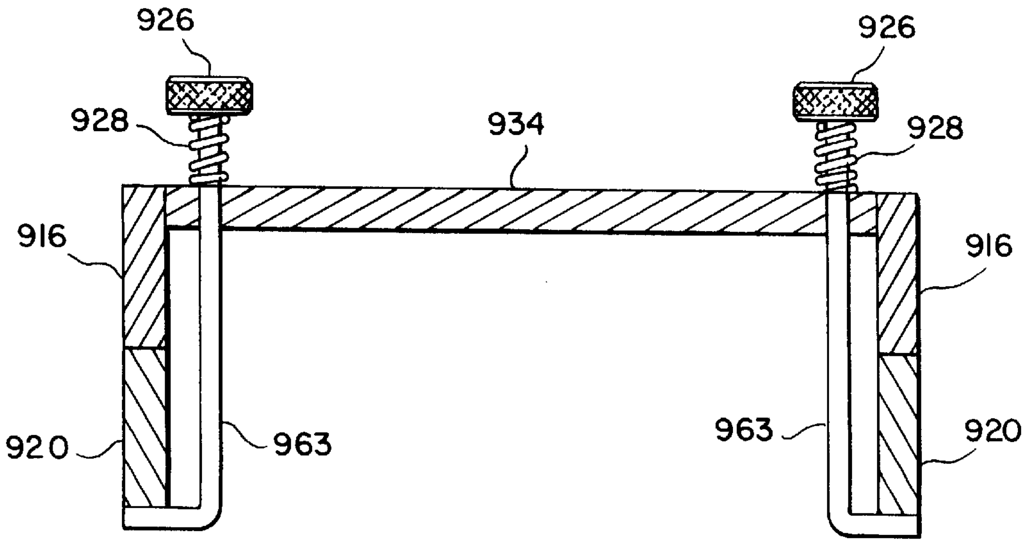

The transport provides a controllable means of receiving a label from a label source such as a printer and transferring it to a label application device rapidly and in such a way that the printer and applicator can execute their respective functional cycles essentially concurrently in time. The transport may take many different forms such as drums, disks, linear belts, etc,to achieve this overlapping cycle function, and all are deemed to fall within the scope of the present invention. In a preferred embodiment, the transport comprises two sets of belts one set above the other driven from a common motor and arranged in such a way that a label can be sandwiched between the sets of belts and moved in a desired direction under the control of the motor. Refer to the transport drawing, FIG. 7A–7E. FIG. 7A is a top plan view of the transport assembly. FIG. 7B is a side elevation view. FIG. 7C is a front elevation view. FIG. 7D is a cross section view of the belt drive rollers taken along the cutting plane A—A of FIG. 7B. FIG. 7E is a cross section view of the clamp assembly taken along the cutting plane B—B of FIG. 7B. Upper 916 and lower 920 side plates are spaced apart by support bars 934 to form two parallelograms. The upper side plates 916 support the upper drive roller 912 and the upper strip roller 930 through bearings 940. The upper drive roller 912 drives a group of drive belts 114 which are placed around the rollers 912 and 930. The lower side plates 920 support the lower drive roller 914 and the lower strip roller 932 through bearings 940. The lower drive roller 914 drives another group of belts 116 which are placed around the rollers 914 and 932. In addition, one of the lower side plates 920 supports a drive motor 118. The drive motor 118 has a timing pulley 906 affixed to its shaft. The lower drive roller 914 has another timing pulley 910 affixed to its shaft and in spatial alignment with motor pulley 906. A timing belt 908 connects the motor 118 to the drive roller 914 via the pulleys. A gear 942 mounted on the shaft of the lower drive roller 914 meshes with a similar gear mounted on the shaft of the upper roller 912 and serves to drive the upper roller 912. As the motor turns clockwise as viewed from the end of the shaft in FIG. 7B, the timing belt 908 drives the lower roller also clockwise, thus causing the top edge of the lower belts 116 to move from left to right. The gears 942 cause the upper drive roller 912 to move counter clockwise, thereby causing the bottom portion of the upper belts to move also from left to right. The upper 912 and lower 914 drive rollers being of identical diameter and the gears 942 also having identical diameters and numbers of teeth, the linear velocities of the upper 114 and lower 116 belts are identical and hence there is no relative motion between the belts.

Dowel pins 956 in the lower side plates 920 fit into socket holes 958 in the upper side plates 916 to align the upper and lower portions together so that the two parallelograms are spatially aligned one above the other and parallel to each other. The springs 902 apply a force between the upper 916 and lower 920 side plates that tends to keep these plates together. The rod clamps 926 and the springs 928 preload the upper and lower sideplates together when the right angle bend of the rod clamp 926 is perpendicular to and directed towards the respective lower side plates 920. When the right angle bends of the rod clamps 926 are away from the side plates 920, the lower parallelogram formed by the side plates 920 is free to rotate away from the upper parallelogram formed by the side plates 916 by pivoting about the abutting faces of the drive rollers 912 and 914. This rotation is limited by the force of the springs 902. When rotated apart in this manner, it is possible to gain access to the common faces of the belts for purposes of cleaning or inspection.

With the rod clamps 926 in their clamped position, the physical spacing between the top surface of the lower belts 116 and the bottom surface of the upper belts 114 is adjusted by the alignment screws 954 in the lower side plates 920. The said belt spacing is adjusted to be equal all around and slightly less than the thickness of the label 102.

As described heretofore, as a label 102 approaches the inlet region 950, the motor is operated in position synchronism with the liner 104 such that the instantaneous belt 114 & 116 velocity is precisely equal to the label or web velocity and hence there is no relative motion of the belts with respect to the label. This insures that there is no displacement force on the label which would mar it or cause adhesive to be dislodged from the label. The belts are normally coated with a material such as silicone that has no affinity for adhesives. When the leading edge of the label 102 is at the common tangent point of the drive rollers 912 and 914, the label is now effectively grasped by the belts 114 & 116. Synchronous operation continues until the trailing edge of the label is at the strip point. Normally, a small amount of the label is still in contact with the liner when synchronous operation ceases. The strip point is actually located vertically somewhat below the common tangent point of the rollers 114 & 116 so that when the belts begin driving the label independently, the drive force on the label tends to lift the label up and away from the liner which makes the label release from the liner readily. Pulling the label parallel to the liner can require very large forces even with a relatively small area of the label still in contact with the liner.

Once the label is free of the liner, its position in the transport is totally controlled by the motor 118. By using a positionally controllable motor such as a stepping motor or a DC servo, the label can be brought to any position within the transport and held there indefinitely. It can also be ejected from the transport by advancing the motor sufficiently far that the label progresses beyond the lower strip roller 932. The exit velocity of the label will be determined by the motor velocity as the label comes off the lower belts 116 at the roller 932. As a practical matter, a DC servo is much to be preferred as a drive motor 118 since such servoes can be implemented with very high speed performance characteristics.

In normal operation, the air block 936 is supplied with positive air from an air supply (not shown). Holes drilled in the block cause air to flow in a direction 938 such that the air flow is upwards and away from the exit point 952 of the transport 115. Once it is determined that a label captive within the transport is to be retained, the positionally controllable motor 118 is instructed to advance the label to a position that corresponds to placing it on the apply head The leading edge of the label leaves the lower strip roller at a relatively high velocity whereupon it encounters the deflector bar 924. The shape of this bar at the point of contact with the label is such as to force the label somewhat downwards. As the label continues to exit, the leading edge enters the air stream 938 from the block 936 which in turn deflects it back up towards the apply head 124. As the trailing edge of the label advances along the lower strip roller 932, it too is deflected downwards by the action of the deflector 924. This has the effect that, as the strip roller 932 turns through the last 90 degrees or so of rotational contact with the label, the contact point of the label with the belt 116 rotates from having the adhesive face in contact with the belts 116 around to having the actual thickness edge of the label in contact as the label leaves. The deflector 924 thus serves to insure that the label completely strips away from the belts. Once the trailing edge of the label is free of the belts, it is carried up by the airstream 938 to the face of the head 124 where it is registered by a pair of alignment pins 960. These pins serve to locate the label accurately on the face of the head.

In the event that it is decided to reject the label, the encapturing air stream 938 is disabled. The motor 118 is then instructed to advance the label to a point considerably beyond the applicator head 124. Assuming a fast response motor drive system such as a DC servo, the label will leave the exit area 952 of the transport 115 at very high velocity traveling effectively as a flat sheet. The absence of the encapturing air stream 938 will cause it to travel well beyond the applicator head 124 before it begins to slow down and tumble. A disposable container (136, FIG. 5E) such as a plastic bag affixed to a wire frame 962 can be located in this region in order to capture such rejected labels.

Inertially Operated Head

The combined requirements of high speed non-contact labelling of rapidly moving packages with considerable height variation necessitated the invention of a unique means of acquiring and applying the label.

Figure 8A:
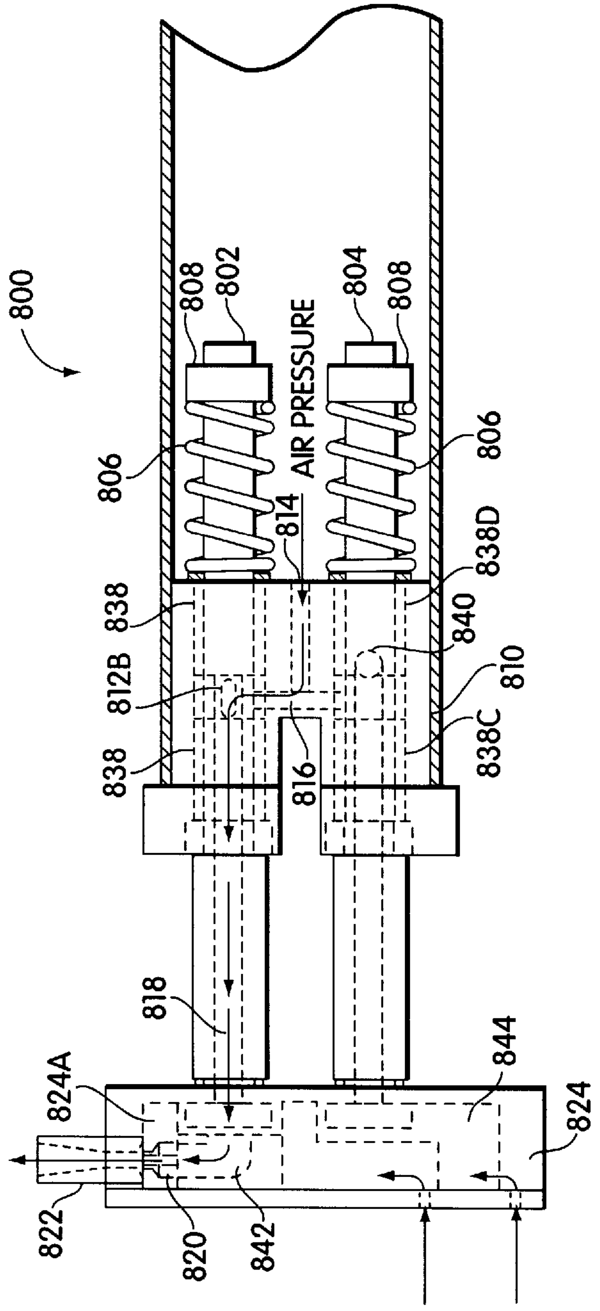
FIG. 8A–8C are cross-sectional views of elements of one embodiment of the inertially operated label application mechanism.

One embodiment of the present invention provides structure for retaining the label during the downward portion of the apply stroke and then controllably releasing the label at the desired point without encountering the problems of long air and vacuum lines that are switched externally to feed a single manifold. FIG. 8A is a side elevational view of one embodiment of the present invention. The inertially operated head assembly 800 comprises an end cap 810 fitted into the end of an applicator arm not shown in the figure. Four sleeve bearings 838 are inserted into two parallel holes drilled in the end cap 810. Two shafts 802 and 804 are supported by the bearings 816. The applicator head 834 is attached to the two shafts at one end and spaced a fixed distance from the end cap 816 by the positioning tubes 836 which are fitted over the shafts in such a manner as not to interfere with the motion of the shafts but to serve as a stop for the applicator head 830. Two compression springs 806 bear against the end cap 810 and the spring retainers 808. One spring retainer 808 is firmly attached to each of the shafts 802 and 804. The springs 806 thus serve to hold the head 834 firmly against the positioning tubes 836, thereby defining the axial position of the shafts 802 and 804. The spring rate and preload is predefined in order to provide a fixed force on the shafts 802 and 804.

A hole 814 drilled in the end cap 810 parallel to the shafts 802 and 804 serves as a pressure port to bring air under pressure from an external source (not shown) into the end cap. The hole 814 terminates within the end cap in another hole 816 drilled perpendicular to the said shafts and along a line that intersects the major axes of the said shafts. This cross hole 816 runs from the intersection of the hole for the shaft 802 to the intersection of the hole for the shaft 804. The length of the bearings 838 is such that the openings of the hole 816 are not restricted by the bearings. The fit of the bearings 838 relative to the shafts 802 and 804 is such that the bearings serve as seals to control air leakage along the shafts to atmosphere. The small amount of air leakage serves to center the shafts in the bearing, thus markedly reducing friction. The two holes 814 and 816 thus serve as a supply port to provide air under pressure to the surface of the two shafts 802 and 804 in the region between the bearings 838.

In the at rest position shown in FIG. 8A, the position of the shaft 802 is such that a slot 812 cut through the shaft 802 is located adjacent to the cross hole 816. A further hole 818 is drilled parallel to the axis of the shaft 802 and extending from its leftmost end in the figure to the slot 812. The hole 818 in the shaft 802 connects to a passageway 842 in the applicator head 834 which passageway 842 further connects to a nozzle 820. Air is expanded through an orifice in the nozzle into a venturi 822 from which it exhausts to atmosphere. The rapidly expanding air creates a region of lower than atmospheric pressure in the passageway 824. The faceplate 846 of the applicator head 834 serves to isolate the various passageways from each other. As shown in FIG. 8C, several orifices 826 drilled in the front surface of the faceplate 846 connect with the passageway 824. The region of lower pressure in the passageway 824 causes external air to flow through the orifices 826 as shown in FIG. 8C. When a label is forced onto the head by the encapturing air stream (938) of FIG. 7B, the label is further captured by the air flowing through the orifices 826 and then held in place by the pressure difference between atmospheric and the passageway 824.

When the applicator starts in motion, the accelerating force on the end cap 810 is applied directly to the head 834 through the positioning tubes 836 and the entire system moves as a composite rigid mass. As the applicator approaches the package to be labelled, the accelerating force reverses direction and the force is now applied from the end cap through the springs 806, the retainers 808, the shafts 802 and 804 and thence to the head 834. The applicator control system controls this reverse accelerating force such that it is approximately equal to the preload force on the springs 806. Therefore as the applicator arm is slowing down, there is no net differential force between the head and the end cap and thus no relative motion. As the arm approaches the perigee of its stroke, the applicator control system suddenly increases the reverse decelerating force sufficiently to overcome the preload on the springs 806. This results in a significant difference in force between the head and the end cap which in turn causes the head 834 to move away from the end cap 810 and further compresses the springs 806 an amount sufficient to restore the force balance.

Figure 8B:
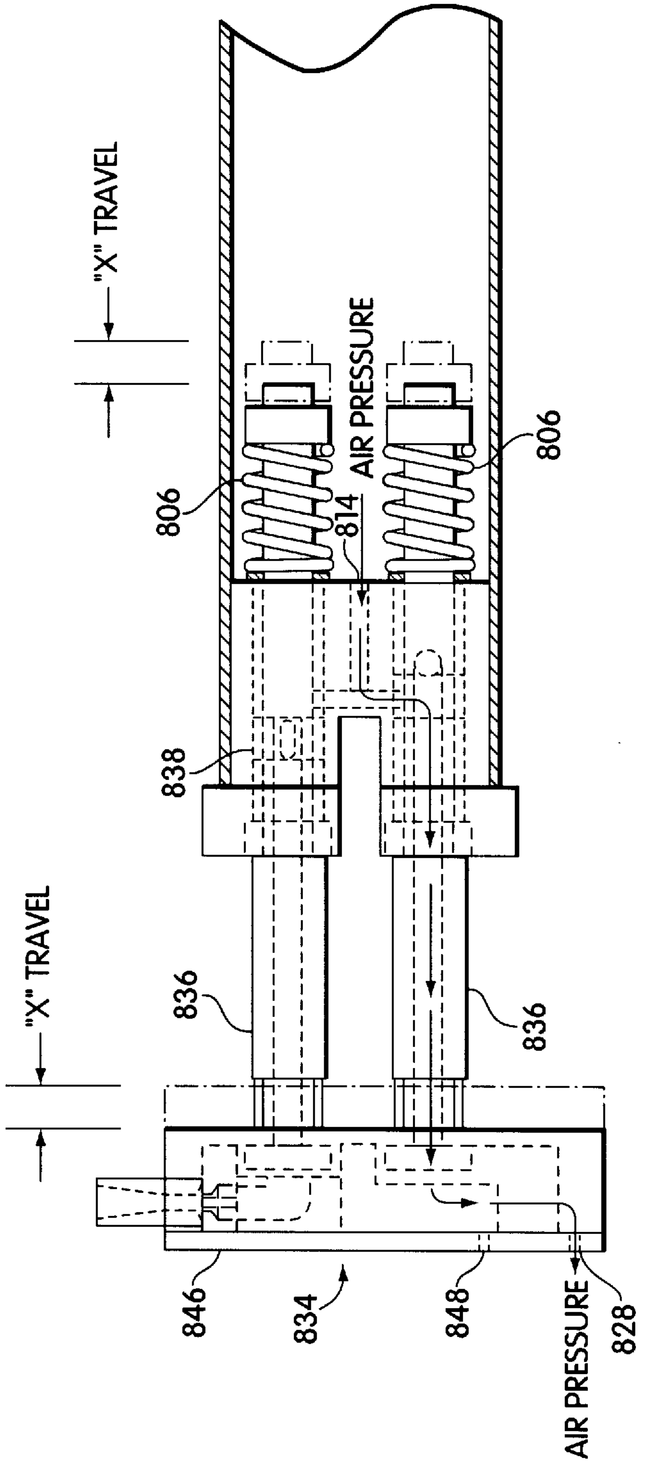
Figure 8C:
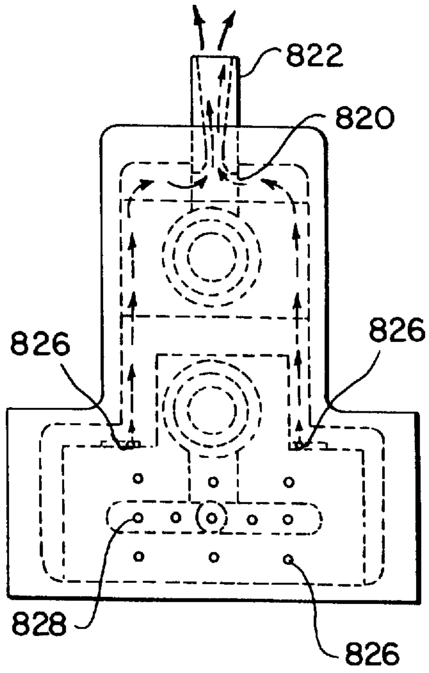

The effect of this action is to cause the condition shown in FIG. 8B. The head 834 has travelled a distance "X" in the figure relative to the end cap 810. The retention shaft 802 cross hole 812 is now isolated from the air supply cross hole 816 by the bearing 838A, thus effectively disabling airflow in the retention shaft 802. The expulsion shaft 804 has moved forward the same distance "X" which brings a cross hole 840 drilled in the shaft 804 out of the bearing 838D and into alignment with the air supply cross hole 840. An air passageway 830 drilled in the shaft 804 and extending from the head 834 attachment point to the cross hole 840 now connects the air supply at cross hole 816 to the pressure passageway 844. The faceplate 846 has another series of orifices 828 that are aligned with the pressure passageway 844. Thus in the extended position as shown in FIG. 8B the low pressure air inflow has been removed from the orifices 826 and higher pressure air outflow is applied to the orifices 828. If a label 102 is in place on the head 834 prior to motion of the head relative to the end cap 810, then when such motion does occur the change in air pressure will be such as to cause the label to be displaced away from the face of the head. Since the motion of the head and shafts is caused by controlling the accelerating forces on the applicator arm 850 and thus the end cap 810, and since further this head motion is caused to occur at the perigee of the arm motion relative to the package to be labelled, the net effect is that the head and shaft assembly acts as a spool valve to cause the label to be propelled from the surface of the head and directed towards the package to be labelled when the head is at its closest point to the package.

In propelling a label away from a surface, it is not sufficient to apply air in any arbitrary pressure form. The force and hence pressure must be sufficient to apply several G's to the label in order to cause it to accelerate away from the head and be applied properly. The rise time of the air pulse must be fast enough to apply the force to the label in a short time relative to the label motion. If the rise time is too slow, the label will leave the head slowly, air will start to flow around the label and the label will flutter and skid and not be applied properly. If the rise time is too fast, it is possible to excite standing wave resonances which will result in no air flow and the label will not come off the head at all. In general, the pressure rise time should be in the order of 100 microseconds to 10 milliseconds for positive control of the label.

The duration of the pressure pulse is also of significance. If too short, not enough energy is imparted to the label to achieve an effective transfer. If too long, the air flow can overrun the label, get in front of it and either prevent it from being applied properly or even actually dislodge the label from the package. A duration of 30 to 50 milliseconds works well.

The inertially operated head herein disclosed is ideally suited for achieving this type of pulse. Even though the arm is in continuous motion throughout the apply cycle, the head and thus the label are in the ideal physical position with respect to the package to be labelled when the valve operates. The pulse duration is readily controlled by the mass of the head and shaft assembly, the spring rate, the spring preload and the return acceleration force. The rise time is easily controlled by the volumes of the respective passageways in the positive air path and by the velocity of the head relative to the end cap which is in turn controlled by the spring constants and the accelerating force. In this way, the performance of the label application system is completely controlled by the physical constants of the head mechanism coupled with the motor that drives the arm mechanism. In fact, the energy to operate the label application mechanism comes completely from the applicator motor, obviating the need to carry heavy actuators such as solenoid valves along with the apply head.

Alternate embodiments include conventional remotely operated valves to switch from low pressure to high pressure and thus apply the label through multiple manifolds as disclosed above. However, to do so requires that both the valves and their actuators must be transported along with the apply head if long output hose lengths and hence slow rise times are to be avoided. This adds considerably to the weight of the moving part of the applicator. Further, in a practical actuator, in order to keep the actuator size and force requirements low, the physical motion of the valve is made perpendicular to the direction of applied air pressure. If this is not done, then the actuator must develop enough force to overcome the full air supply pressure over the valve surface area. When the motion is perpendicular, the valve and actuator become physically bulky and awkward to package. Further, the valve itself is subject to the accelerating forces on the applicator and these must be taken into account in the design to assure reliable operation. In contrast, the inertially operated head disclosed synergistically exploits these factors and forces and results in an optimum design.

Applicator

As described heretofore, the applicator system comprises a printer or other source of labels, a mechanical buffer or transport for interfacing between the label source and the apply mechanism, a properly controlled apply mechanism and an inertially operated applicator head. The overall applicator is shown in FIG. 6A–FIG. 6E. A preferred embodiment of the controller is shown in FIG. 3.

Figure 6A:
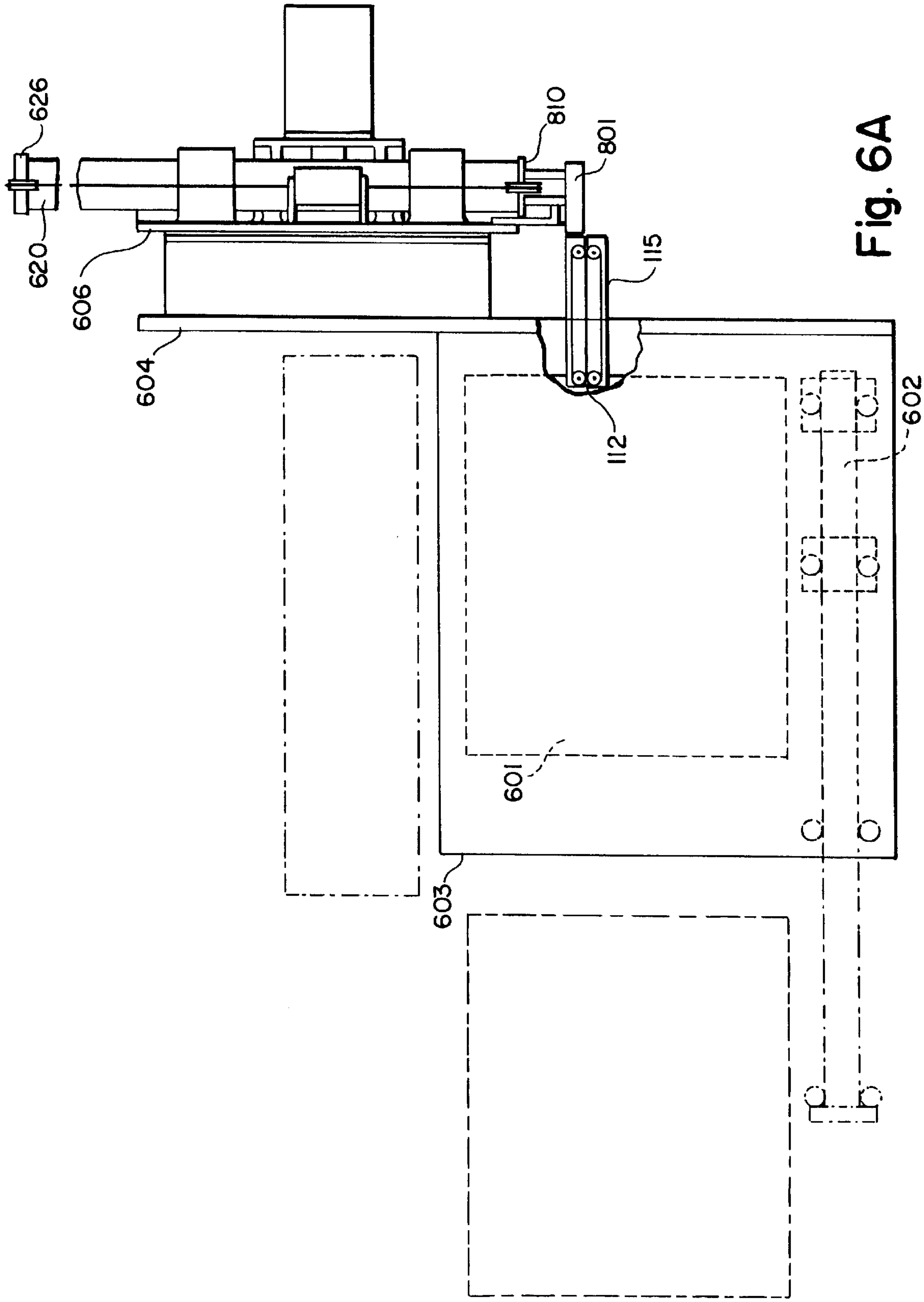
FIG. 6*a*–6E are plan and elevational views of one embodiment of the present invention.

Referring to FIG. 6A, a printer 601 is mounted on a sliding drawer assembly 602 that is attached to a frame 603. The drawer assembly is configured in such a way that the strip point 112 of the printer is immediately adjacent to and slightly below the entry point (950) of the transport 115. By modifying the drawer configuration printers from different manufacturers can be installed in the system. The drawer assembly 602 permits the entire printer to be withdrawn from the frame 603 for full access to the printer when changing stock or performing maintenance.

The transport 115 is rigidly mounted to the frame 603. When the printer is fully in place in the frame, the transport 115 is capable of receiving labels from the printer 601 as disclosed heretofore. A front plate 604 is also attached to the frame 603 and serves to support the apply mechanism. The apply mechanism comprises a pivotable casting 606 that is mounted to the frame 604 through a hole in the casting 606 using a shoulder screw 610 and thrust bearings 608. Guide blocks 612 mounted to the front plate 604 support spring loaded plungers 614. The tips of the plungers 614 bear against small recesses 618 in the side surface of the casting 606 and serve to hold the casting in place as shown in FIG.

6B. The purpose of the pivotable mounting is to permit the entire applicator arm to rotate safely away from its normal operating position in the event that it is struck by an object on the moving conveyor. In the event of a failure for any reason such that the arm is extended downwards and subsequently struck, when the torque on the pivot casting exceeds that produced by the plungers 614 on the casting 606, the plungers will retract and the entire arm and casting assembly will rotate away from the direction of the package as shown in FIG. 6D without damage to the applicator or package. The applicator controller will signal this condition. An operator can then take corrective action including manually rotating the pivot casting to its home position.

Sleeve bearings 624 are fitted into bearing housings 622 which are an integral part of the casting 606. A hollow cylindrical shaft is inserted into the bearings 624 which serve as guides to permit free motion in a vertical direction as shown in the figure but restrain it from other translational motion. Front 810 and rear 626 end caps are inserted into the arm 620 and serve to support the four pulley assemblies 628. Two other pulley assemblies 630 are mounted to the casting 606. A motor 632 is mounted to the casting 606. An encoder 634 is attached to the shaft of the motor and serves to generate an electrical signal that is indicative of relative motion of the shaft. A helically grooved drive pulley 636 is also attached to the motor shaft. A woven steel cable 640 is run from an anchor point 638 on the casting 606 around the two pulleys 628 in the rear end cap 626, around the upper idler pulley 630, and then wrapped several times around the motor drive pulley 636. The free end of the cable then passes around the lower idler pulley 630, down around the two pulleys 628 mounted in the front end cap 810 and finally terminates at the lower end of the cable anchor point 638. The cable terminators are threaded shafts not shown which are crimped onto the cable and which pass through holes in the anchor point. Nuts threaded onto these shafts serve to restrain the cable and provide a means for adjusting the cable tension. The cable tension is adjusted to provide positive tension under all loading conditions.

Figure 6B:
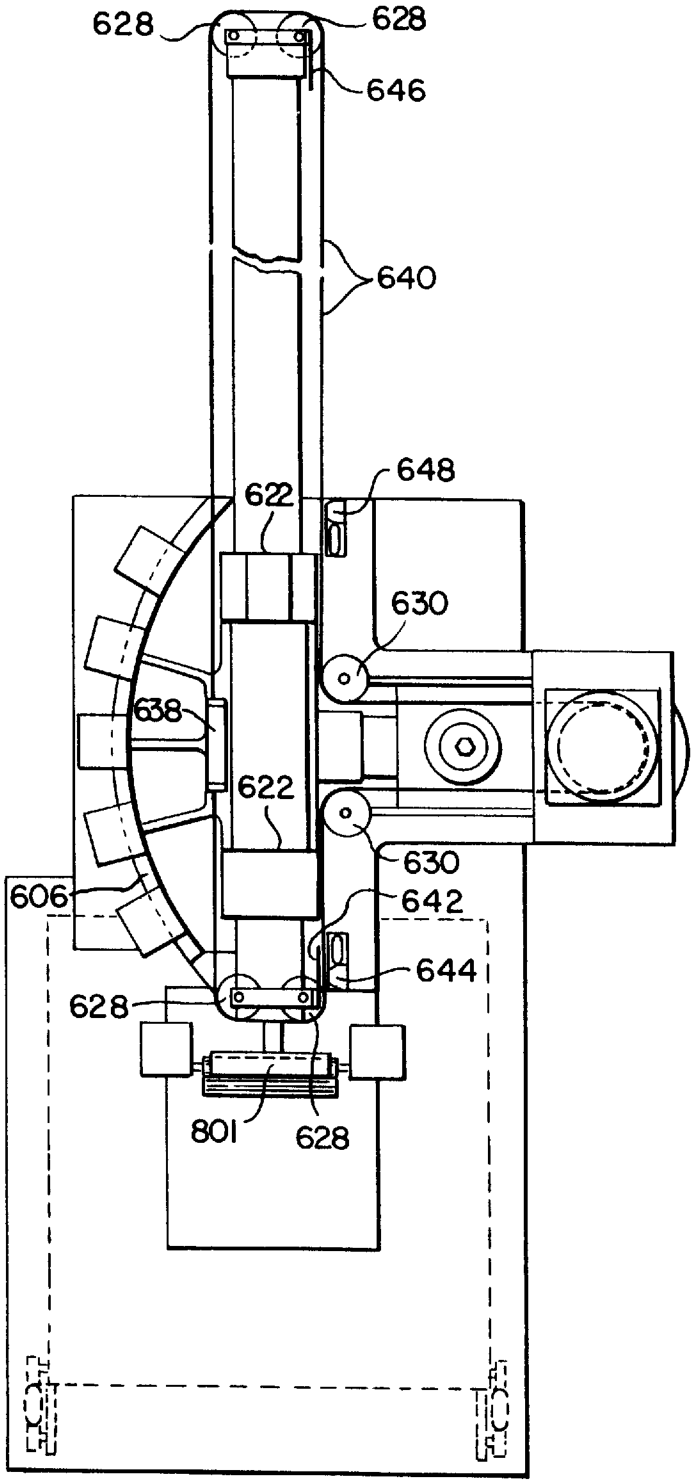
Figure 6C:
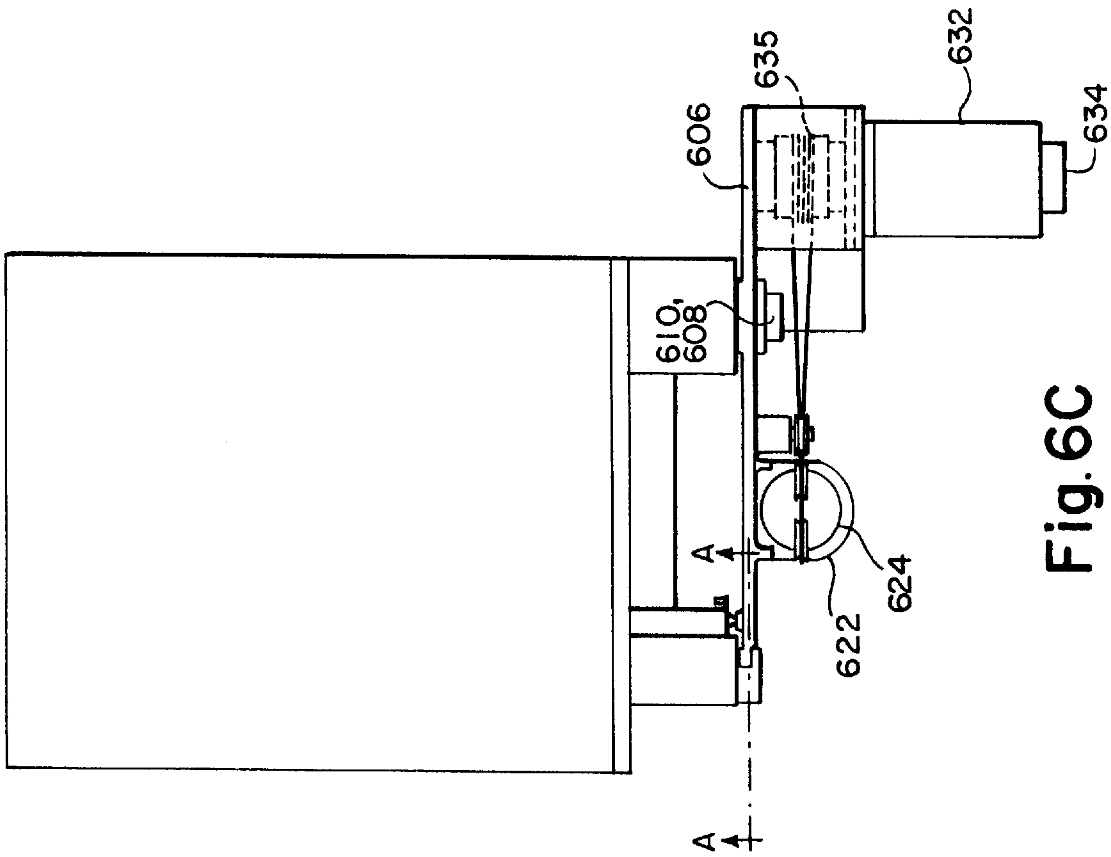
Figure 6E:
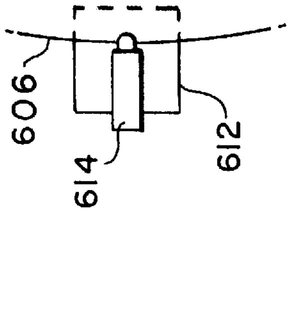
Figure 6D:
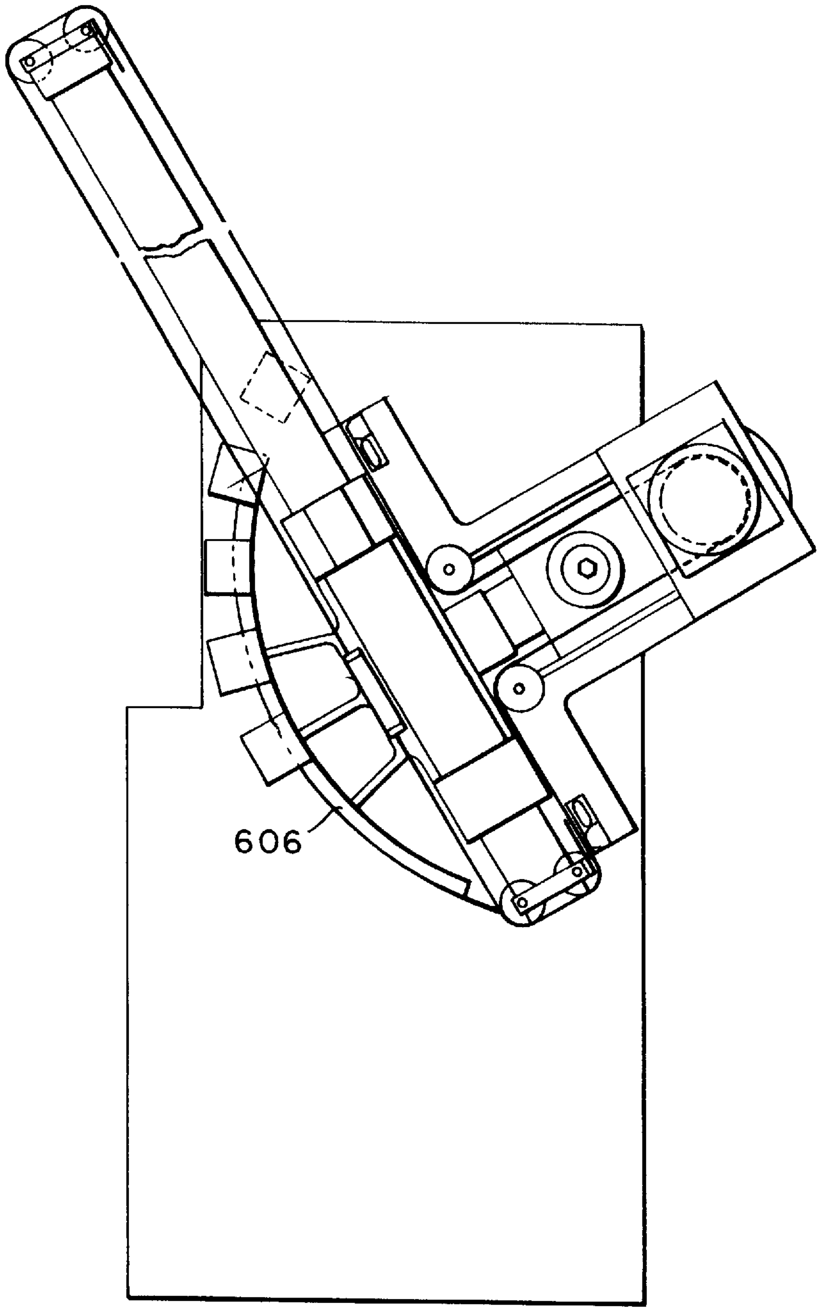

In the arrangement just described, if the motor shaft is held stationary, the arm 620 will be supported by the cable 640 as shown in FIG. 6B. If the motor shaft is rotated in a clockwise direction in the figure, the arm will move in a vertically descendant direction. One full revolution of the motor shaft will result in a length of cable equal to PI times the diameter of the drive pulley being withdrawn from the upper loop of the cable and fed into the lower loop, the resulting arm motion thus being one half of this cable length. Similarly, counter clockwise motion of the motor shaft will result in motion of the arm that is vertically ascendant. There is thus a direct correspondence between the rotational angle of the motor shaft and the position of the applicator arm. The arrangement thus described has the further advantage that the forces imparted to the arm by the action of the motor shaft on the cable are vertically directed forces that act on the centroid of the arm. This means that there are no rotational moments about either horizontal axis of the arm which further means that there are no side loads on the sleeve bearings 624. Hence the bearings 624 serve merely as guides for the arm 620, the entire weight of the arm being supported by the cable 640 through the motor 632.

An inertially operated applicator head 801 as described heretofore is fitted into the lower end cap 810 and serves to accept labels from the transport 115 and apply them to packages when suitably controlled by the motion of the applicator arm 620.

A sensor 644 is operated by a flag 642 and serves to detect that the arm is in an upper or retracted position. Another sensor 648 is activated by a flag 646 and serves to detect that the arm is in a lower or extended position.

The applicator drive motor in this preferred embodiment may be any positionally controllable motor that will provide the required position control accuracy and speed of response. Good examples include a stepping motor or a servo motor with a position servo. The package throughput and label positioning accuracy determine the motor performance requirements. In this preferred embodiment, packages are to be labelled at rates of up to 4000 per hour which results in an overall cycle time of 900 milliseconds. The transport permits one label to be printed while a previously printed label is being applied. The print cycle time depends upon the label length and the printer. Presently available thermal label printers are capable of speeds of 6 inches per second or greater for label widths of up to 5 inches. Hence a reasonably sized label of say 4 inches wide by 3 inches long can be printed in well under 800 milliseconds which means that the overall throughput is governed by the applicator cycle time plus the time to remove the label from the transport. If 100 milliseconds of the 900 milliseconds overall cycle time is allocated to the transport for placing the label on the head and allowing the label to physically stabilize prior to cycling the applicator, then 800 milliseconds remains for the applicator worst case cycle time. As disclosed above, in the instant embodiment this height can vary from a very small dimension (a flat envelope, for example) up to 32 inches.

One embodiment of the present invention provides a constant acceleration, constant deceleration system and lets the velocity be a variable. This results in a more or less triangular velocity profile and a cycle time that is proportional to the square root of the distance traveled. For example, using an acceleration of 3 G's and a deceleration of 2 G's results in a cycle time of 262 milliseconds for 4 inches of travel and a cycle time of 790 milliseconds for 36 inches of travel. The peak velocities are 61 inches per second and 182 inches per second respectively. The high velocity combined with the required torque are unattainable with drives such as stepping motors but are readily realized with a DC permanent magnet motor operating in a position servo. It should be noted that the accelerating and decelerating forces are relatively modest resulting in low operating stresses and smooth performance. The cycle time is achieved by allowing the velocity to build to a peak and then smoothly decelerating to a stop. This results in the square law travel distance characteristic as defined by the following expression:

$$t=((SQR(2*A*S/(D\hat{}2+D*A))+SQR(2*D*S/(A\hat{}2+D*A)))\qquad(1)$$

where t=one way cycle time

S=travel distance one way

A=accelerating force

D=decelerating force

Since a digital microprocessor is typically used to control the applicator including the timing of when to start the applicator cycle relative to the position of the package on the conveyor and the conveyor velocity, the square law travel time vs distance characteristic presents no problem in implementation. The time could be calculated directly from the above equation (1), but in practice it is more simply calculated by solving the above equation initially for the cycle time as a function of several incremental discrete distances and storing the results thus calculated in a table in the operating program. In then determining when to initiate the apply cycle (step 564 of FIG.(4) ), the time values corresponding to the closest distances above and below the actual travel distance are read from the table and the actual travel time is determined by linearlly interpolating between these two values. This table method has the further advantage that other restrictions such as velocity limits or nonlinearities in the motor can be empirically determined and included in the table values.

Given that the cycle time can be calculated as above, there now remains the question of how to achieve the constant accelerating and decelerating forces required. Here again characteristics of the DC permanent magnet motor provide the solution. Over the speed ranges of interest, the acceleration on a cable mass system as described above is $$A=T*r/(W*(r\hat{\ }2)/(2*G)+J) \tag{2}$$

where

A=acceleration

T=Torque on the motor r=radius of motor pulley

W=weight of the applicator arm

G=acceleration due to gravity

J=moment of inertia of motor & pulley

Since r,W,G and J are all constants, the acceleration is a linear function of torque. If the torque is constant, the acceleration will be constant. For a DC motor, the torque developed is a linear function of current $$T=K1*I \tag{3}$$

where

T=Motor developed torque

K1=motor torque constant

I=motor armature current hence if the motor armature current can be held constant, the developed torque and thus the acceleration will be a constant. Since deceleration is simply acceleration in the opposite direction, it follows that changing the sign of the current will result in constant deceleration. Thus controlling the sign and magnitude of the motor current will result in a constant acceleration or deceleration system.

The terminal voltage for a DC motor is given by $$V=K2*w+I*R \tag{4}$$

where

V=motor terminal voltage

K2=motor back emf constant w=motor shaft angular velocity

I=motor armature current

R=motor armature resistance

Rearranging and solving for the armature current gives $$I=(V-K2*w)/R \tag{4A}$$

thus the armature current is a linear function of the terminal voltage and the motor shaft velocity. Hence if the terminal voltage of the motor can be controlled as a function of the motor shaft velocity, the current and hence acceleration can be made a constant. From the equation (4) for the terminal voltage, it is seen that the term I*R is simply a signed constant voltage for any given current. The other term K2*w is a linear function of the motor angular velocity hence if the instantaneous angular velocity can be measured, the required terminal voltage is readily calculated. In the instant embodiment, the use of a digital signal processor makes this a straightforward task as will be seen subsequently by an exemplary flow chart.

In the instant embodiment, the linear velocity of the applicator arm is related to the angular velocity of the motor by the constant r/2 where r is the radius of the motor drive pulley and the denominator of 2 takes into account the mechanical advantage of the pulley system.

$$v=w*r/2 \tag{5}$$

Similarly, the instantaneous position of the applicator arm is related to the shaft angle of the motor by the same constant. Hence controlling the shaft angle position and velocity of the motor results in a direct control of the applicator arm position and velocity. There now arises the question of when to switch over from acceleration to deceleration in order to achieve the required position time profile. The distance that the arm will travel during the acceleration portion of the down cycle is given by $$s1=0.5*A*t1\hat{\ }2 \tag{6}$$

where s1=distance traveled during acceleration

A=acceleration t1=acceleration time

At the end of time ti, the velocity will be given by $$v1=A*t1$$

The distance that the arm will travel during deceleration is also given by a similar expression $$s2=0.5*D*t2\hat{\ }2 \tag{7}$$

where s2=distance traveled during decel

D=deceleration t2=deceleration time

The time t2 is given by the time it takes to go from a velocity v1 down to zero assuming a constant deceleration force D which is $$t2=v1/D \tag{8}$$

which yields $$s2=0.5*v1\hat{\ }2/D \tag{9}$$

This is the travel distance required to bring the applicator to a complete stop from any given velocity v1.

In a position servo system, control is achieved by measuring the present position of a position sensitive device and subtracting the present position from a reference or desired position. This difference is referred to as the position error. This position error is then used to control the servo actuator in such a way as to reduce the error. In the instant embodiment, the desired applicator arm position is the travel distance down to the package. This distance is provided to the applicator servo motor controller as the reference in units of motor shaft position. When the applicator arm is at rest, changing the reference in this manner results in a large position error which in turn operates the servo motor as will be explained. As the motor starts to accelerate, the position error begins to diminish at the same time that the motor increases in velocity. As was noted above, the distance that it takes to bring the applicator to a complete stop is proportional to the square of the velocity at any time. Hence a second servo error is calculated as follows $$PERR=REF-POS \quad (10)$$

$$SERR=PERR-K3*(v1^2)/D \quad (11)$$

where

PERR=present position error

SERR=servo dynamic error

REF=servo position reference

POS=servo present position v1=instantaneous arm velocity

D=desired constant deceleration

K3=scale factor for the system

In other words, the position error is in fact the travel distance remaining and the servo dynamic error is a measure of when the position error is less than or equal to that required to bring the arm to a complete stop. In practice then, as long as the signs of the two errors are the same, the system should be accelerating. When the sign of the second servo error reverses, it is time to switch to deceleration. This then provides the control means for operating a constant acceleration/deceleration system and knowing when to switch over. Once it reverses sign, the second servo error will maintain a small reversed sign value near zero as the servo decelerates. This calculation is readily handled in the instant embodiment as will be shown.

This same control algorithm is also a necessary and sufficient condition for stability of a position servo, since the servo position error goes to zero at exactly the same time that the servo velocity goes to zero hence a servo controlled in this manner is intrinsically stable. A further advantage is that the control scheme is automatic and independent of travel distance, the equation involving only the servo position error, the servo velocity and the desired deceleration.

Thus it has now been shown that with a suitable control scheme it is possible to construct a variable stroke label applicator that will have predictable time distance characteristics for the apply stroke which characteristics can be used to determine in advance when to initialize the apply operation in order to compensate accurately for motion of a package on a conveyor over a wide range of package heights and conveyor speeds. The acceleration and deceleration levels chosen are such as to provide the required cycle time performance while at the same time keeping mechanical stresses to a modest level. A further advantage to this control scheme is that it is now possible to devise and operate the inertially operated head described heretofore. By controlling the deceleration on the applicator as it approaches the package to be less than the preload force on the springs 806 of FIG. 8, the head valve remains in the label retention mode. By then accelerating the applicator back at a higher rate, the forces on the applicator overcome the spring preload and the valve operates to project the label onto the package. The shape of the pressure pulse is readily controlled by the duration and operating time of the return acceleration force which can be shaped as need be. This modulation has no deleterious effect since the return time need not be the same as the apply time and further it need not be known in advance. However, even if such need did arise, the use of a look up table with piecewise linear interpolation for predicting performance as discussed heretofore will permit many forms of force modulation to be used and still achieve predictable results.

Servo Operation

The block diagram of FIG. 3 shows a servo amplifier 219 operating a DC permanent magnet motor 220 from a pair of pulse width modulator outputs of the controller 201. A shaft angle encoder 223 is attached to the shaft of the motor 220 and serves to encode its present position. As the shaft turns, the encoder generates signals proportional to the motor shaft angle. In the instant embodiment, these are in the form of two pulse trains in quadrature, there being a constant number of pulses in each train per full revolution. This shaft position and velocity measurement technique is generally well known in the art. The signals thus generated are connected to ports on the controller 201 one of which automatically determines and stores the time of occurrence of one phase of the pulse train. The internal program determines the polarity of the other phase, from which it determines the direction of rotation. The program also calculates the velocity of the shaft by calculating the time difference between successive pulses and dividing this time differential into the shaft angle rotation per pulse.

The transport servo is implemented similarly, using an amplifier 224 connected to a second pair of pulse width modulator outputs of the controller 201, a servo motor 118 and an encoder 222. Both servoes use full H-bridge switching type field effect transistors as amplifiers 219 and 224 operating directly from the pulse width modulator outputs of the controller 201.

FIG. 10 is a schematic drawing of a typical amplifier. The two pulse width modulator outputs 250 and 251 of the controller 201 determine the direction of rotation of the motor 223. Pulses are applied to one or the other but not both simultaneously. The Programmable Array Logic device 252 receives these signals 250 and 251 as well as a high frequency clock 256. This clock has a period of about 200 nanoseconds and can be synchronous with the cycle time of the controller 201. The signals 250 and 251 are decoded by the PAL 252 into further signals 253, 254, 255 and 256, FIG. 10. These signals are connected to level shifters 257 and 258 which convert them to a level suitable for operating the Field Effect Transistors 261, 262, 265 and 266. Diodes 273, 274, 275 and 276 connected across the field effect transistors serve to bypass reverse current around the transistors. In quiescent operation, the signals 250 and 251 are false. The PAL 252 makes the signals 253 and 255 also false, which turns both transistors 261 and 265 off through the signals 259 and 263 respectively. The PAL 252 makes the signals 254 and 256 true which in turn switches the transistors 262 and 266 on through 260 and 264. If the motor is stationary nothing further happens. If the motor is turning, a back emf develops across the motor terminals and current flows through one of the transistors 262 or 266 back through the opposite diode 276 or 274 and hence through the motor armature. The transistor—diode pair conducting is determined by the polarity of the motor terminal voltage, that is by its direction. The result is that the armature sees a low resistance path across its terminals and hence the armature is heavily damped.

If one of the signals, e.g. 250, goes true, the PAL 252 immediately turns off the lower transistor 262 by signal 254. One clock time later the PAL asserts the signal 253 thereby assuring that the lower transistor 262 is off before turning on the upper transistor 261. This interval 269 is shown in the timing diagram.

When the upper transistor 261 is turned on, the full supply voltage Vs is applied to the armature 223 through the filter 278, 280 and 279. The filter serves both to remove the amplifier switching frequency from the motor armature and to filter RF interference. Transistor 261 stays on as long as the signal 250 is asserted. When 250 is turned off, the PAL 252 immediately removes 253, hence turning 261 off. One clock time later, the PAL turns 254 back on, hence turning the transistor 262 back on. The clock time interval results in the delay 270 again assuring that 261 is off before 262 turns back on. During all this time, 266 remains on. By switching only one half of the bridge and allowing the other half to remain on, switching losses are confined to only one half of the bridge at any given time, again improving efficiency.

The operation of the other half of the bridge formed by the transistors 265 and 266 is similar in response to the signals 255 and 256. The PAL 252 is programmed to prevent simultaneous operation of both upper halves of the bridge under any conditions such that if both signals 250 and 251 were to be simultaneously true, neither 259 nor 263 would be true.

The output voltage across the motor terminals is thus proportional to the supply voltage Vs times the duty cycle of the applied pulse. The polarity is determined by the signal asserted (250 or 251). During the on time, current flows through the selected upper bridge transistor, the filter and the lower opposite bridge transistor. During the off time, current flows through the lower diode on the side just selected, the filter and the opposite bridge transistor. The motor voltage and current is thus the average of these instantaneous values, averaging being accomplished by the filter. The motor inductance could be used to accomplish this averaging but doing so causes very noisy electrical operation plus high armature eddy current loss due to the amplifier modulation rate. Using a separate filter permits low loss cores and capacitors to be used resulting in far superior performance. In addition, the use of a filter capacitor across the armature insures that the instantaneous DC armature terminal voltage is in fact the average of the power supply voltage times the duty cycle of the amplifier.

The amplifier just described is also capable of sinking current back to the power supply if the motor is generating a back emf greater than the average applied terminal voltage. During the off time of the upper transistors, the motor terminal voltage appears fully across the filter inductors 278 and 279 and causes the current in the inductors to rise linearly in a direction determined by the polarity and by an amount proportional to the motor back emf. During the on time of the upper transistor, the full supply voltage less the motor terminal voltage appears across the filter inductors resulting in the slope of the current changing direction at a rate proportional to this voltage difference. If the average amplifier output voltage, i.e. the duty cycle times the supply voltage, is equal to the back emf, the average power supply current integrated over the pulse period will be zero. If the average voltage is greater than the back emf, then the average current in the filter will start to increase and current will flow from the power supply, limited only by the armature resistance and possible changes in back emf. Similarly, if the average voltage is less than the back emf, then the average current in the filter will change direction and flow back into the power supply, again limited only by the armature resistance and changes in the back emf. The kinetic energy stored in the motor is thus being put back into the supply, resulting in a design of good efficiency and well damped performance. Thus the postulate stated above that the system acceleration can be controlled by controlling the motor current is directly realized using the amplifier described with a pulse width modulation servo. The processor establishes a pulse width that is determined from the sum of the back emf plus the desired current times the armature resistance all divided by the supply voltage and outputs this pulse width to the appropriate side of the amplifier. The result is an average DC voltage out of the filter that exactly equals the motor back emf plus the IR term. The IR term can be of the same or different sign relative to the back emf term. If the same, current will flow into the motor resulting in acceleration, if different, current will flow out of the motor resulting in deceleration.

Figure 9A:
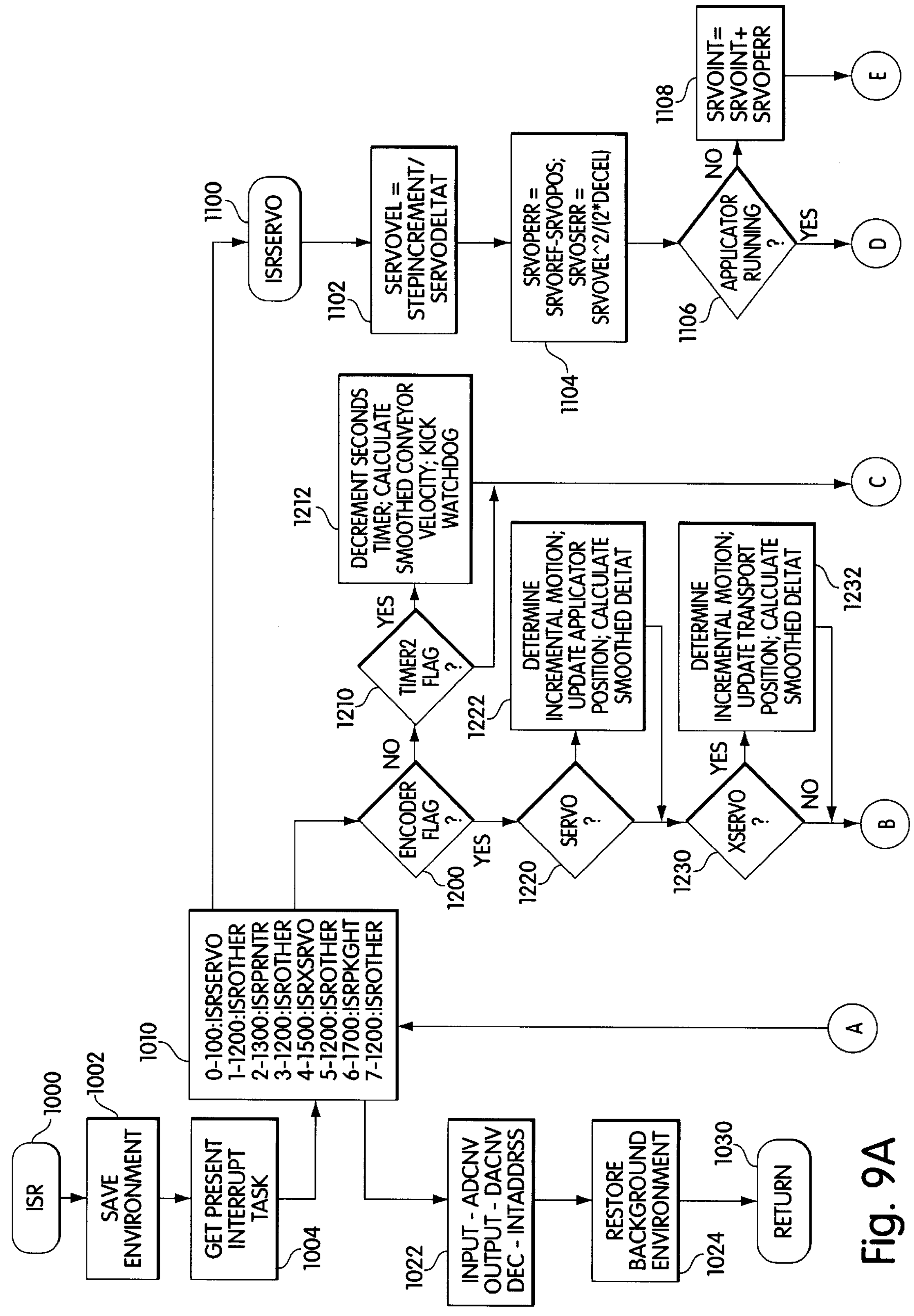
FIG. 9A and FIG. 9B together form a flow chart of the applicator servo control system.
Figure 9B:
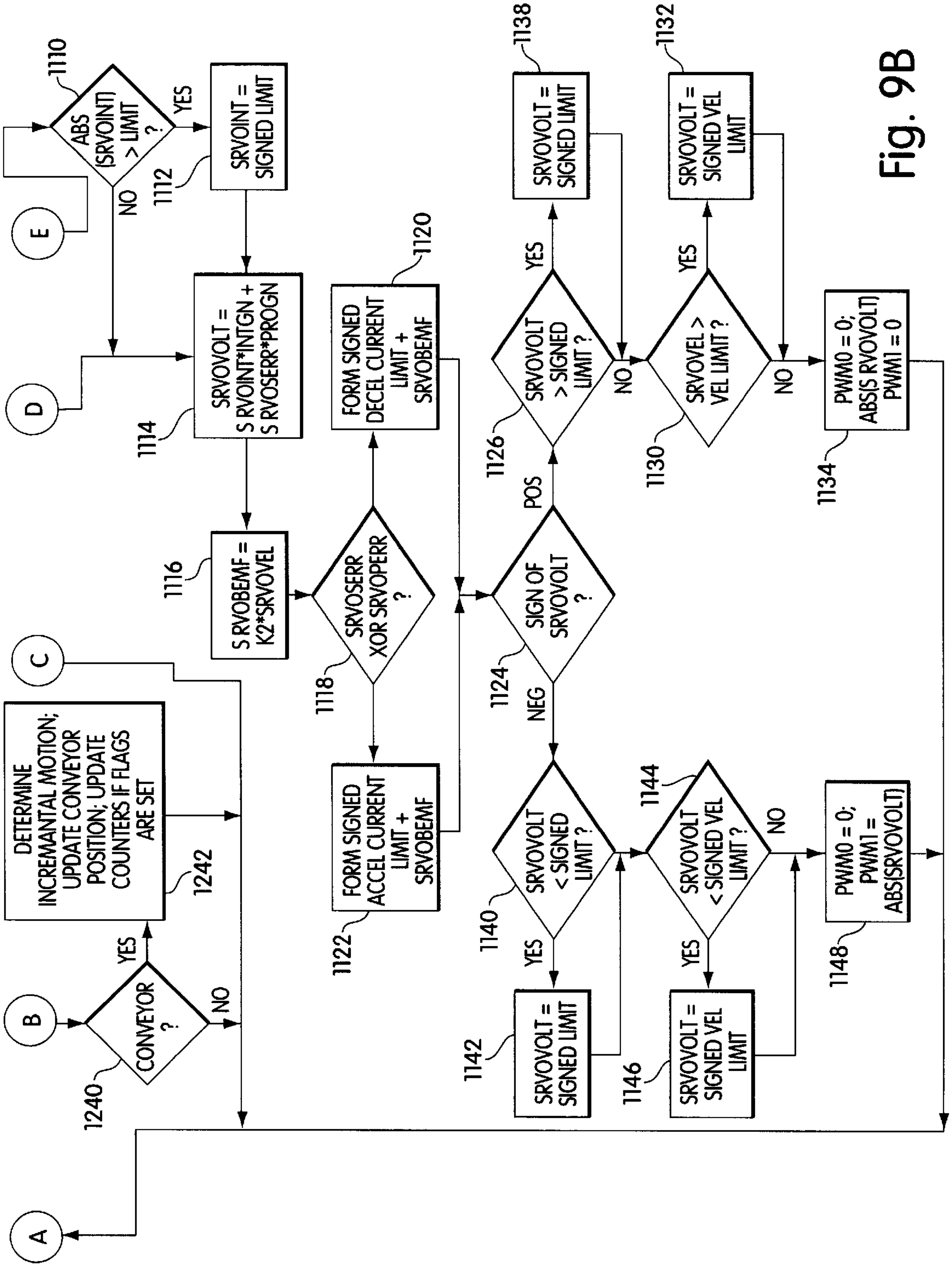

FIG. 9 is a flow chart of the applicator servo control system. The applicator control program comprises a background monitor program which is essentially described in FIG. 4 operating in conjunction with a real time hardware control program that is driven by a single timer interrupt. In the instant embodiment, timer interrupts occur every 50 microseconds. At each timer interrupt, the background program is suspended and control transfers to the interrupt handler. The interrupt handler saves the background environment, executes its task as described below, restores the background environment and returns control to the background program. There are eight separate interrupt tasks. One task is performed at each interrupt. Therefore, each task is executed at least once every 400 microseconds.

As disclosed heretofore, the processor required to accomplish these tasks must be quite fast and is in general of the form of a digital signal processor. Any processor with a reasonable instruction set and an execution time in the order of 200 nanoseconds or less per instruction can be used. The processor chosen is the TMS320C14 as manufactured by Texas Instruments, the choice being made because of the on chip four channel pulse width modulator system and the four channel time of transition capture system.

Referring to FIG. 9, the 50 microsecond timer interrupt causes the background program 500 of FIG. 4 to suspend operation, mark its place and branch to the interrupt service routine 1000. At step 1002 the internal operating environment of the processor (accumulator, status registers, etc) is saved to insure orderly resumption of the background program. At step 1004 the value of the interrupt task counter is determined, from which the identification of the currently scheduled task is determined in step 1010.

There are 8 tasks in step 1010 of which one (1200:ISROTHER) is repeated 4 times, alternating between 4 additional tasks. The ISROTHER task monitors the encoder input channels as well as other timers. It is scheduled to be selected on every other interrupt in order to insure an adequate sampling rate for the fastest encoder speed. Step 1010 calls for the task currently scheduled which is then executed. Following execution, the program returns to step 1022 in which an analog to digital converter is read and the results stored in a table addressed by the interrupt task counter. Next the contents of a location in random access memory selected by a background diagnostic program are output to a digital to analog converter. Finally the interrupt task counter is decremented circularly to establish the task for the next interrupt. The background environment is then restored in step 1024, and the program returns to background in step 1030.

In step 1010, if the task counter calls for the program ISROTHER, then in step 1200 it is determined if an encoder transition has occurred on any encoder channel. This is done by examining an internal interrupt status register in the microprocessor. Interrupting events set flags in this register. Another register called the mask register determines whether these flags will in fact cause the program to be interrupted. In the instant embodiment, only the 50 microsecond timer interrupt is enabled; all others are masked off. The status of other interrupts can be determined by polling the status register. If there are no encoder interrupts pending, it is next determined in step 1210 if a timer2 interrupt has occurred. Timer2 is a 25 millisecond timer used to maintain low resolution counters and perform less critical real time calculations. If not, the program returns to 1010 and hence completes the interrupt service routine. If a timer2 interrupt has occurred, the program executes step 1212 in which a seconds timers is decremented, a watchdog timer is retriggered and the average conveyor velocity is calculated. The watchdog timer is a retriggerable automatic counter that will stop at zero and output a control line which will disable the motor drivers. As long as the counter is periodically preset it will never time out and hence the motors will be enabled. In the event that the program fails to refresh the watchdog timer, the motors will be disabled. Execution then returns to 1010 as before.

If an encoder interrupt is pending, it is determined in step 1220 if it was from the applicator servo encoder. If so, the magnitude and direction of the incremental motion since the last servo encoder interrupt are determined, step 1222. From this determination, the new servo position is calculated by adding the signed incremental displacement to the previous servo position. When the encoder generated the interrupt request, the processor automatically stored the time of occurrence of the interrupt request in a memory buffer. The program subtracts this time from the time of the previous encoder pulse and thus determines the time interval between successive pulses. It then updates a memory location with the time of the present pulse in anticipation of the next such calculation. The program maintains an average time interval between pulses value in memory (SRVDLTAT). The average time interval between encoder pulses is calculated by digital filtering, for example taking one fourth of the present time interval and adding to it three/fourths of the average value in memory. The average value in memory is then updated with the result obtained.

The program then advances to the step 1230 where it determines if a pulse from the transport servo encoder has generated an interrupt request. If so, it executes step 1232 which is identical to step 1222 except that the results are maintained in memory registers specific to the transport. The program then advances to step 1240 where it determines if a pulse from the conveyor encoder has requested an interrupt. If so, in step 1242 it determines the magnitude and sign of the conveyor incremental motion and updates the conveyor present position. There are a number of counters associated with the conveyor that are controlled by various states within the background program. Flags for these states are interrogated, and, if active, various counters are decremented or incremented as appropriate. These counters serve to track the location and separation of packages on the conveyor for different parts of the program. The program then exits through step 1010.

In step 1010, if it is determined that the task counter has scheduled the program ISRSERVO, control then branches to 1100 from which in step 1102 the present applicator servo velocity is calculated as the ratio of the size of the step increment to the smoothed value of the time increment between encoder pulses ascertained in step 1222. The sign of the velocity is determined from the sign of the incremental motion obtained in step 1222. In step 1104, the servo position error is calculated as the difference between the servo reference and the current servo position. The servo dynamic error (SRVOSERR) is now calculated as the servo position error minus the servo velocity just calculated squared divided by twice the known deceleration force. As discussed before, the results of this calculation are used to achieve stable damping of the servo as well as determining the crossover point between acceleration and deceleration.

It is next determined in step 1106 if the applicator is actively running. If so, in step 1108 the servo integrator error is calculated as the sum of the previous servo integrator error plus the present servo position error. In order to prevent the integrator from accumulating too high a value, a signed limit is tested in step 1110. If the signed limit is exceeded, the integrator output is set to the limit, step 1112. The integrator allows the servo to insert an offset value just sufficient to support the servo against any static loads while at the same time allowing the servo position error to go to zero. Since the servo position error can become very large while the applicator is running resulting in the integrator output saturating back and forth, the test in 1106 bypasses the integration function while the error is large, integrating only when the servo is quiescent.

In step 1114 the actual servo output (SRVOVOLT) is calculated as the servo integrator output times a fixed integrator gain plus the servo dynamic error times a fixed proportional gain. This then corresponds to the amplified output voltage that would be applied to a motor in a conventional servo. In step 1116, the signed servo back emf is calculated as the product of a constant for the actual motor in use times the servo velocity. In step 1118 it is now determined if the applicator is accelerating or decelerating by comparing the signs of the servo position error and the servo dynamic error. If the same, the servo is accelerating and a signed motor voltage limit is formed in step 1122 from the acceleration current limit plus the servo back emf. The accel current limit term is a constant that represents a voltage determined from the motor torque and resistance characteristics as explained previously. If the signs of step 1118 are different, a different lower compensated value is established for the limit in step 1120.

The sign of the servo amplified output voltage is tested in step 1124 and if positive, the voltage is tested to see if it exceeds the signed limit, step 1126. If so, the output voltage is set equal to the signed limit in step 1128. A limit is also established for the servo velocity. In step 1130 this limit is tested. If the servo velocity is greater than this limit, the servo voltage is set equal to that corresponding to the velocity limit, step 1132.

The pulse width modulator output is usually stored as a counter value. The counter has a full scale value that corresponds to 100% duty cycle. In the instant embodiment, this counter is the same as the interrupt timer and has a full scale value of 255 with an operating period of 50 microseconds. Thus the output pulse width modulator counter can be set to any value between 0 and 255 to establish a duty cycle of 0 to 100%. The actual output motor voltage will then be the supply voltage times the pulse width modulator counter value divided by 255. These scale factors are used in carrying out the computations discussed above, but will not be elaborated on further. Suffice it to say that the SRVOVOLT number that results from all of the above is in counts to the pulse width modulator.

Since the sign of SRVOVOLT was positive, the final value is output to the positive pulse width modulator (PWM0 or 250 of FIG.10) and the negative pulse width modulator (PWM1 or 251 of FIG.10) is set to zero. In the instant embodiment, the pulse width modulators are repetitive, that is, the pulse width value is actually stored in a register. Each time the interrupt timer counts down to zero, the value from the register is stored in the pulse width modulator counter and the interrupt timer is reset to the full scale value of 255. The same clock that operates the interrupt timer also operates the pulse width modulator counter. As long as the pulse width modulator counter is above zero, the pulse width modulator output will be asserted. Once the pulse width modulator counter goes to zero, the pulse width modulator output will go to zero. Thus the pulse width modulator output is a pulse the repetition rate of which is determined by the interrupt timer and the duty cycle of which is determined by the value stored in the pulse width modulator register.

If the sign of the servo output voltage in step 1124 is negative, similar tests are made in steps 1140 and 1144 to see if the negative limits are exceeded. If so, the servo voltage is truncated to the limits in steps 1142 or 1146. In step 1148, the PWM0 output is disabled and the PWM1 output is set to the absolute value of the servo output voltage. The routine then exits through 1010.

Another interrupt service routine ISRXSRVO denoted 1500 in step 1010 controls the transport servo motor. 1500 implements essentially the same routine 1100 as just discussed and is thus not further discussed.

The interrupt service routine 1300 of step 1010 monitors the printer motor phases and controls communications between the system monitor, the external data source and the printer. While necessary to the operation, the techniques employed are well known and not discussed further.

The interrupt service routine 1700 controls the package height detector. This device is the subject of the abovementioned copending application where it is fully disclosed and so will not be elaborated upon further.

Modifications and substitutions made by one of ordinary skill in the art are considered to be within the scope of the present invention which is not to be limited except by the claims which follow.

What is claimed is:

1. A label printer applicator, comprising:

means for transporting a first printable media in a direction;

a printer adapted to print on said first media while on said means for transporting;

an applicator for applying said first printed media on a selected surface of an object; and a buffer for receiving said first printed media, having a movable storage element distinct from said applicator means and providing said first printed media to said applicator means.

2. The label printer applicator of claim 1, further including discrimination means for determining insufficient space between said object and a preceding object to permit movement of said applicator necessary to apply said first printed medium to said object, and means for rejecting said first printed media after being received by said buffer according to determination of said insufficient space.

3. The label printer applicator of claim 1, wherein said printer is printing on a second printable media while said first printed media is being applied.

4. The label printer applicator of claim 1, wherein said buffer comprises dual confronting movable belts for transporting said printable media therebetween.

5. The label printer applicator of claim 1, further including means for providing positive air pressure against said applicator for retaining said printable media thereon upon release from said buffer.

6. A method of printing and applying a label, comprising the steps of:

printing a first label;

transferring said first label into a buffer for storage therein and having a first cycle period;

transferring said first label from said buffer to a controllable applicator and having a second cycle period distinct from said first cycle period; and applying said first label on a surface of an object.

7. The method of claim 6, further including the steps of:

detecting unacceptable labelling conditions according to at least one of package motion and package position; and aborting transfer of said first label to said controllable applicator upon detection of said unacceptable labelling conditions.

8. The method of claim 6, further including the step of:

printing a second label while said first label is being applied.

9. The method of claim 6, wherein the step of transferring includes moving said first label from a point of reception to a point of discharge.

10. The method of claim 6, further including the step of providing a positive air stream against said first label after being transported to said controllable applicator.

* * * * *